US008837449B2

(12) United States Patent
Chen et al.

(10) Patent No.: US 8,837,449 B2
(45) Date of Patent: Sep. 16, 2014

(54) UNIVERSAL INTEGRATED CIRCUIT CARD UPDATES IN A HYBRID NETWORK

(75) Inventors: Xuming Chen, San Ramon, CA (US); Lawrence S. Rybar, Basking Ridge, NJ (US); Bhaskar Srinivasiah, Atlanta, GA (US); Praveen Venkataramu, Bridgewater, NJ (US); Bjorn Hjelm, Livermore, CA (US)

(73) Assignees: Cellco Partnership, Basking Ridge, NJ (US); Verizon Patent and Licensing Inc., Basking Ridge, NJ (US)

(*) Notice: Subject to any disclaimer, the term of this patent is extended or adjusted under 35 U.S.C. 154(b) by 833 days.

(21) Appl. No.: 12/916,334

(22) Filed: Oct. 29, 2010

(65) Prior Publication Data

US 2012/0106533 A1 May 3, 2012

(51) Int. Cl.
*H04B 1/69* (2011.01)
*H04B 7/216* (2006.01)

(52) U.S. Cl.
USPC .......................................... 370/342; 370/252

(58) Field of Classification Search
USPC .................................................. 370/342, 252
See application file for complete search history.

(56) References Cited

U.S. PATENT DOCUMENTS

| | | | | |
|---|---|---|---|---|
| 7,200,385 B1* | 4/2007 | Wallenius et al. | ......... | 455/414.1 |
| 8,190,198 B1* | 5/2012 | Venkataramu | ............. | 455/552.1 |
| 8,295,858 B2* | 10/2012 | Fox et al. | .................... | 455/456.4 |
| 2004/0121793 A1* | 6/2004 | Weigele et al. | ............... | 455/522 |
| 2006/0175417 A1* | 8/2006 | Ho | ................. | 235/492 |
| 2006/0229090 A1* | 10/2006 | LaDue | .......... | 455/507 |
| 2008/0267114 A1* | 10/2008 | Mukherjee et al. | ........... | 370/315 |
| 2009/0054039 A1* | 2/2009 | van Wijk et al. | ........... | 455/412.1 |
| 2009/0054040 A1* | 2/2009 | van Wijk et al. | ........... | 455/412.1 |
| 2009/0054091 A1* | 2/2009 | van Wijk et al. | .............. | 455/466 |
| 2009/0082001 A1* | 3/2009 | Yu et al. | ........................ | 455/418 |
| 2009/0082004 A1* | 3/2009 | Duggal et al. | ................ | 455/419 |
| 2009/0217364 A1* | 8/2009 | Salmela et al. | .................... | 726/6 |
| 2010/0004003 A1* | 1/2010 | Duggal et al. | ............. | 455/456.3 |
| 2010/0112980 A1* | 5/2010 | Horn et al. | ..................... | 455/411 |
| 2010/0227588 A1* | 9/2010 | Bradley | ........................ | 455/411 |
| 2010/0227591 A1* | 9/2010 | Park et al. | ..................... | 455/411 |
| 2011/0002267 A1* | 1/2011 | Dwyer et al. | ................. | 370/328 |
| 2011/0028134 A1* | 2/2011 | Celik | ......................... | 455/414.2 |
| 2011/0029671 A1* | 2/2011 | Deprun et al. | ................. | 709/225 |
| 2011/0092253 A1* | 4/2011 | Amiel et al. | ........................ | 455/558 |
| 2011/0195700 A1* | 8/2011 | Kukuchka et al. | ......... | 455/422.1 |
| 2011/0223887 A1* | 9/2011 | Rune et al. | ..................... | 455/411 |
| 2011/0244880 A1* | 10/2011 | Chin et al. | ................. | 455/456.1 |
| 2011/0280166 A1* | 11/2011 | Nien et al. | ..................... | 370/310 |
| 2012/0108204 A1* | 5/2012 | Schell et al. | .................. | 455/411 |
| 2012/0115477 A1* | 5/2012 | Ali et al. | ..................... | 455/435.1 |
| 2013/0115948 A1* | 5/2013 | Kukuchka et al. | ......... | 455/435.1 |

* cited by examiner

*Primary Examiner* — Jay P Patel

(57) ABSTRACT

A universal integrated circuit card (UICC) may include a universal subscriber identity module (USIM); a code division multiple access (CDMA) subscriber identity module (CSIM); a memory to store instructions; and a processor. The processor may execute instructions to determine a type of wireless access network available to a user equipment (UE) associated with the UICC; perform updates of the UICC using the USIM, in response to detecting a CDMA enhanced High Rate Packet Data (eHRPD) network, a Global System for Mobile Communication (GSM) access network, or a Long Term Evolution (LTE) access network; and perform updates of the UICC using the CSIM, in response to detecting an available CDMA access network other than a CDMA eHRPD access network.

26 Claims, 34 Drawing Sheets

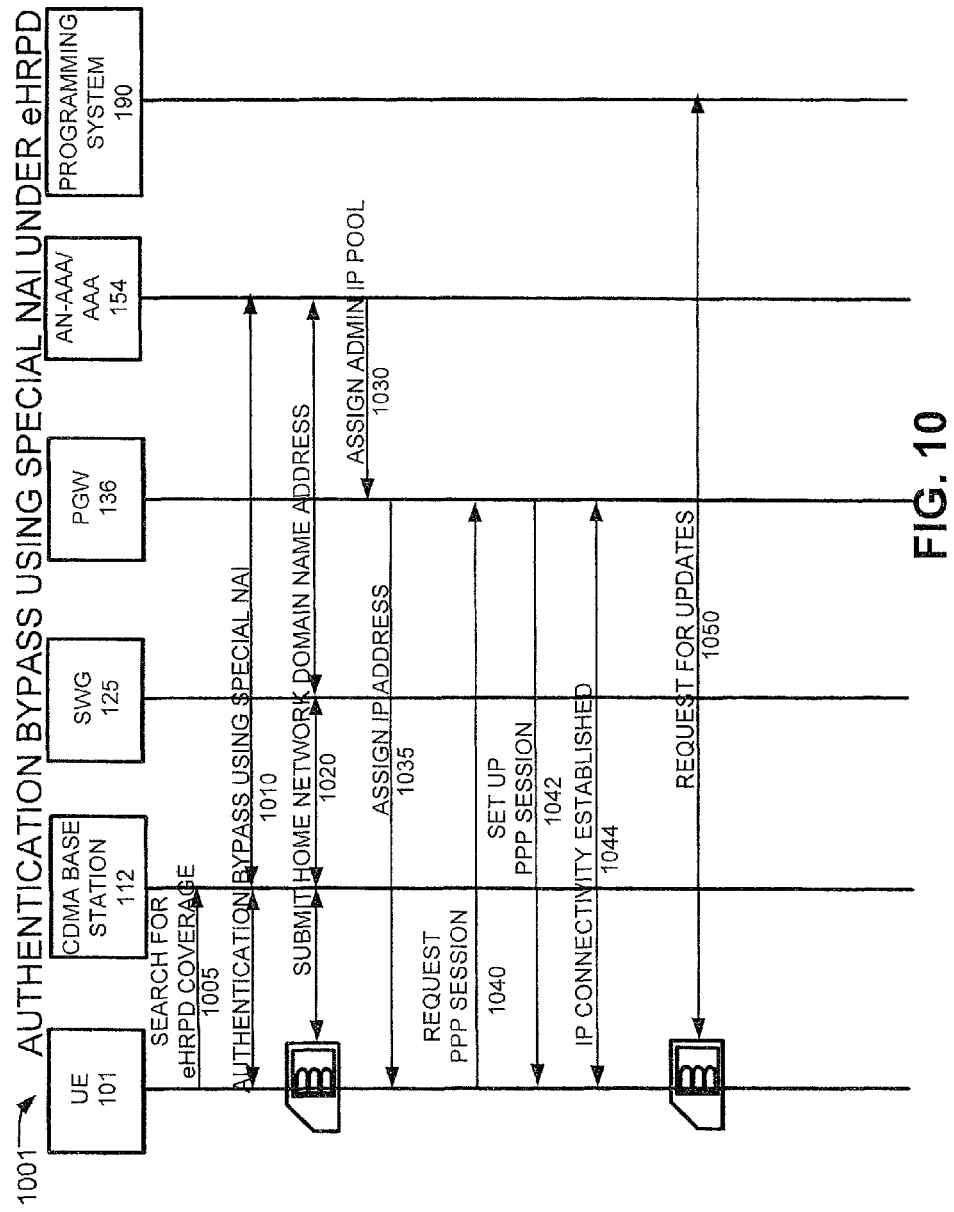

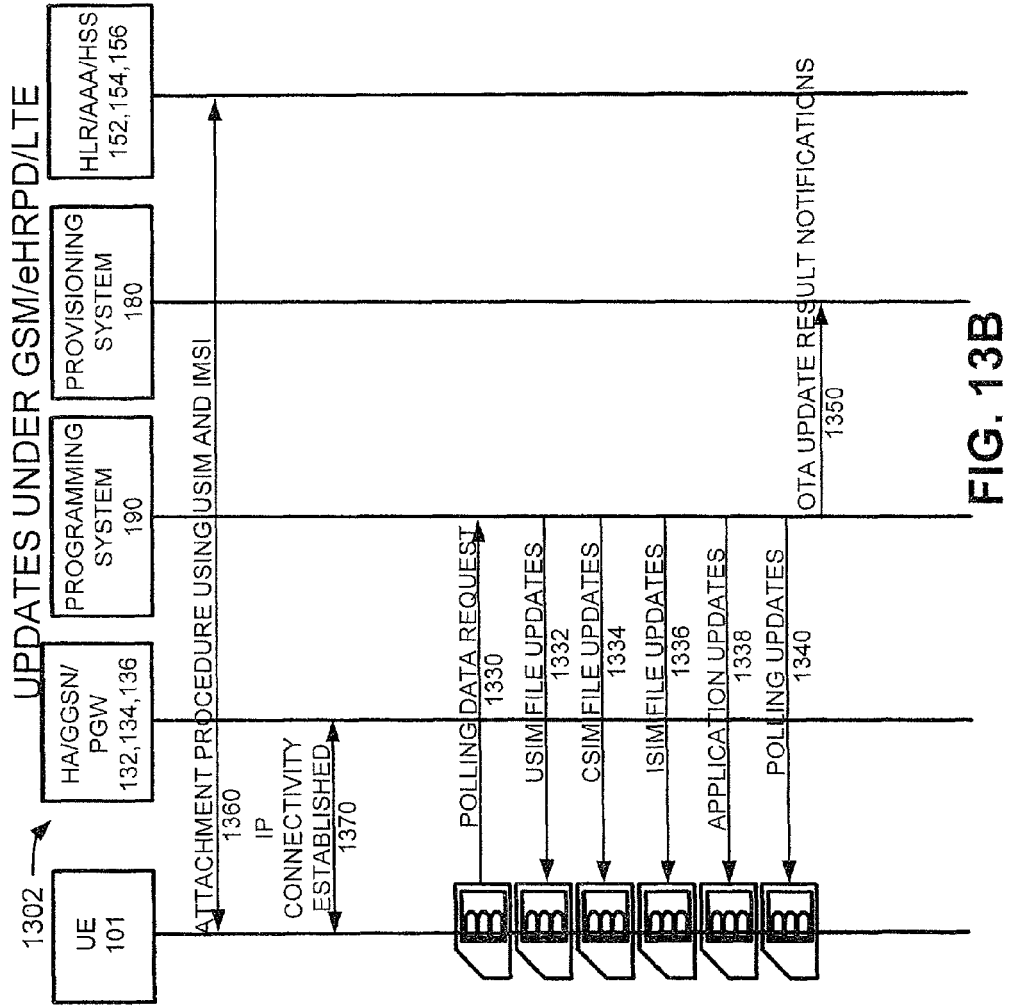

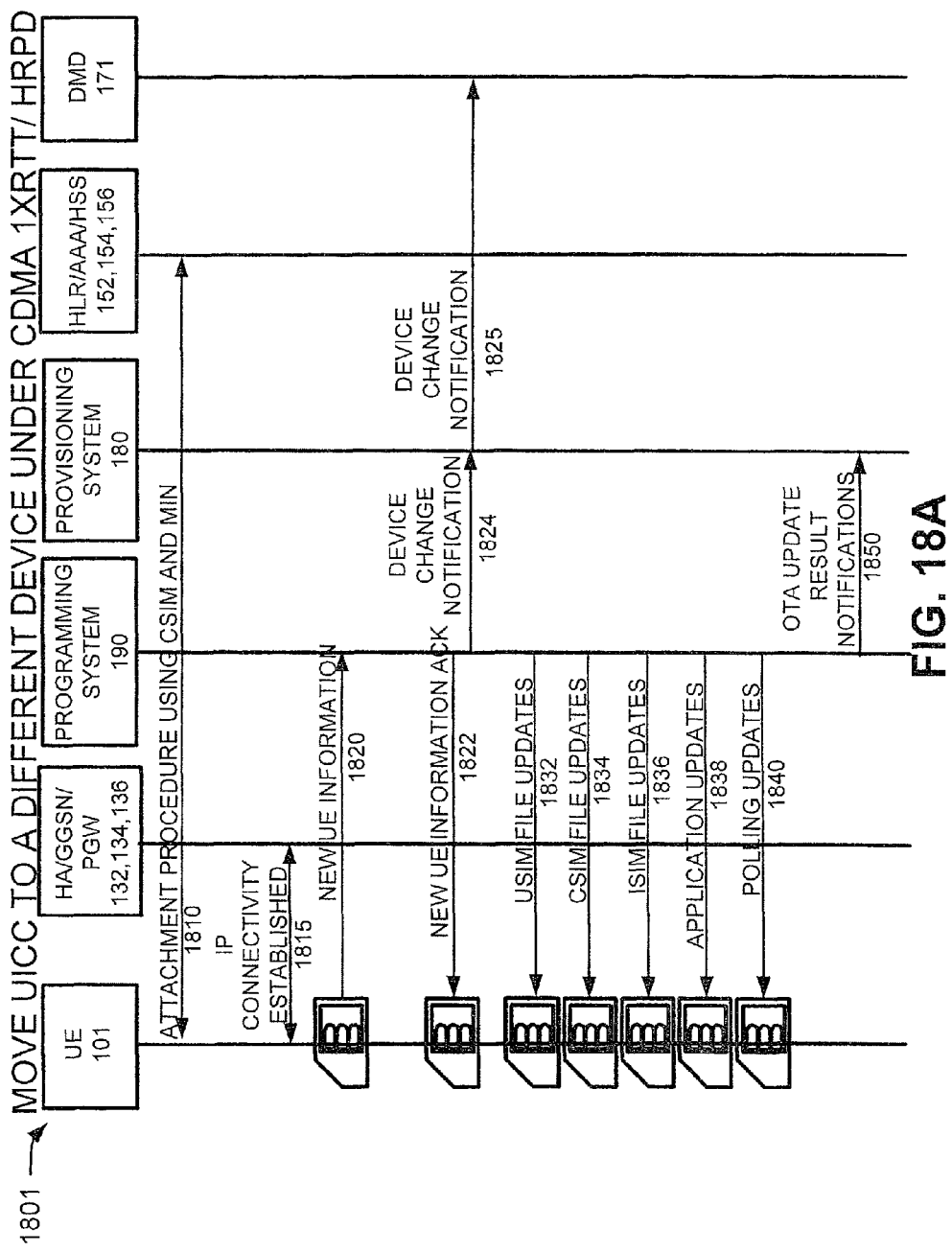

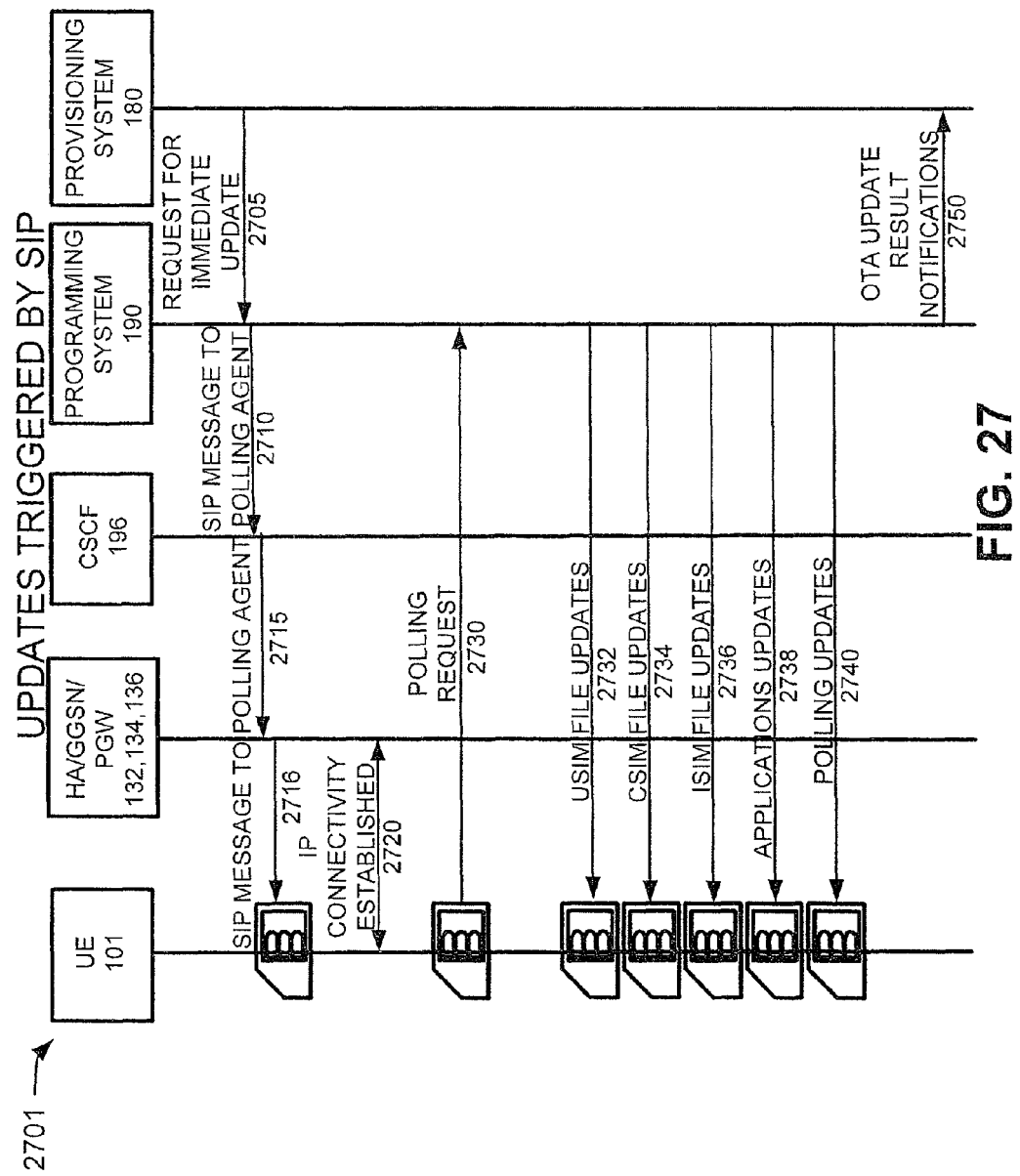

UNIVERSAL INTEGRATED CIRCUIT CARD UPDATES IN A HYBRID NETWORK

BACKGROUND INFORMATION

Mobile wireless communication devices continue to increase in popularity, leading to increasing numbers of users and to demands for more services and higher data rates. In order to satisfy the needs of users and to improve service, providers of mobile wireless communication services continue to improve wireless access networks, as well as core networks, used to deliver services for users of mobile communication devices. One aspect of such improvements may include the development of access networks based on newer standards, protocols, and/or technologies.

While a service provider may update an access network in a particular geographic area to a new generation access network, by, for example, installing a new base station, other geographic areas may continue to be served by an older generation network. A new generation access network may operate under different protocols, use different standards, or include different network nodes than an older generation network.

A mobile communication device, referred to herein as user equipment (UE), may include a subscriber identity module (SIM), which may be used by an access network, and/or a core network, to identify a user of the UE. In a hybrid network, which includes an older generation access network and a new generation access network, management of a SIM may prove to be particularly troublesome.

BRIEF DESCRIPTION OF THE DRAWINGS

FIG. 10 is a diagram illustrating an example signal flow of the authentication bypass under eHRPD coverage according to an implementation described herein;

FIG. 13B is a diagram illustrating an example signal flow of performing UICC updates under LTE or eHRPD coverage according to an implementation described herein;

FIG. 18A is a diagram illustrating an example signal flow, in response to moving the UICC to a new UE, under CDMA coverage according to an implementation described herein;

FIG. 27 is a diagram illustrating an example signal flow of triggering updates via a SIP message according to an implementation described herein.

DETAILED DESCRIPTION OF PREFERRED EMBODIMENTS

The following detailed description refers to the accompanying drawings. The same reference numbers in different drawings identify the same or similar elements. Also, the following detailed description does not limit the invention.

An implementation described herein may relate to a universal integrated circuit (IC) card (UICC) updates. A UICC may include one or more SIMs. A SIM identifies a subscriber in a particular access network. A subscriber may switch UEs by removing the SIM from a first UE and placing the SIM in a second UE. A UICC may include a code division multiple access (CDMA) SIM (CSIM), an Internet Protocol (IP) Multimedia Subsystem (IMS) SIM (ISIM), and a universal SIM (USIM). A CSIM may be used for authentication in CDMA mode, under CDMA 1XRTT coverage and under CDMA high rate packet data (HRPD) coverage. An ISIM may be used in connection with an IMS network. A USIM may be used in CDMA mode under enhanced HRPD (eHRPD) coverage, in Global System for Mobile Communication (GSM) mode, and in Long Term Evolution (LTE) mode. Thus, UICC updates may be performed in either CDMA or GSM/LTE mode.

Under CDMA 1XRTT coverage, over the air special provisioning (OTASP) may be performed, using an over the air function (OTAF) number stored in the CSIM, to perform authentication and establish 1XRTT IP connectivity. Under HRPD coverage, a special network access identifier (NAI), stored in the CSIM, may be used to bypass both access network authentication and packet data network (PDN) gateway authentication and establish IP connectivity. Under eHRPD coverage, the special NAI may be used to bypass access network authentication and an NAI, derived from an International Mobile Subscriber Identity (IMSI), may be used for PDN gateway authentication.

Furthermore, an implementation described herein may relate to sending short message service (SMS) messages to a UICC for triggering immediate UICC updates. Additionally, an implementation described herein may relate to reporting, by a UICC, that the UICC has moved to a new UE using SMS messages. Additionally, an implementation described herein may relate to sending Session Initiation Protocol (SIP) messages, via an IMS network, to a UICC for triggering immediate UICC updates.

Figure 1:
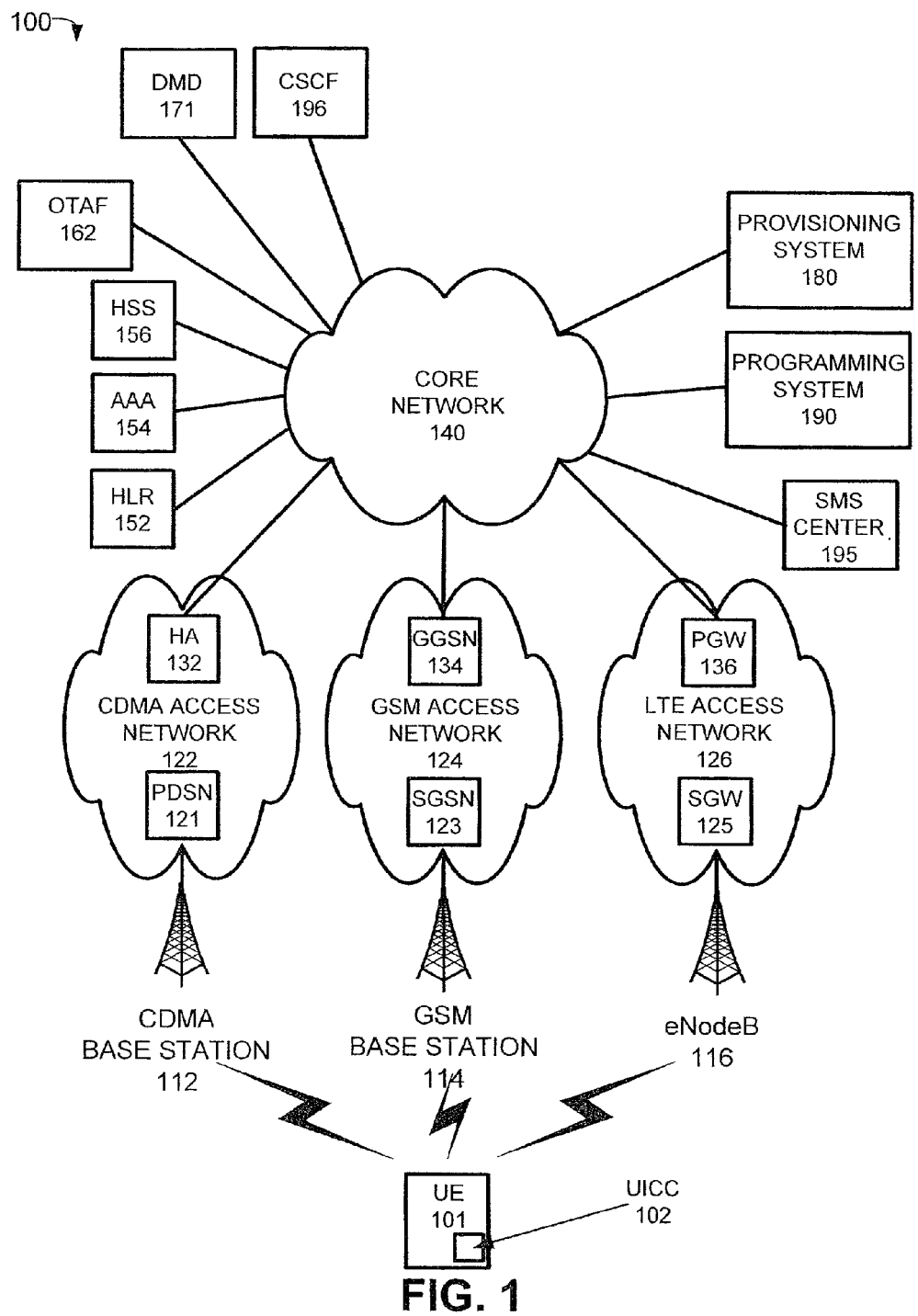
FIG. 1 is a diagram illustrating example components of a system according to an implementation described herein.

FIG. 1 is a diagram illustrating example components of a system 100 according to an implementation described herein. As shown in FIG. 1, system 100 may include a UE 101, a CDMA access network 122, a Global System for Mobile Communications (GSM) access network 124, a Long Term Evolution (LTE) access network 126, a core network 140, a home location register (HLR) 152, an authentication, authorization, and accounting (AAA) server 154, a home subscriber server (HSS) 156, an over the air function (OTAF) 162, a device management database (DMD) 171, a provisioning system 180, a programming system 190, short message service (SMS) center 195, and a call session control function (CSCF) 196.

UE 101 may include any wireless communication device that a user may use to connect to a CDMA base station 112, GSM base station 114, and/or eNodeB 116. Thus, UE 101 may include a dual mode UE capable of operating in both CDMA mode and in GSM and/or LTE mode. UE 101 may include, for example, a mobile communication device, such as a mobile phone, a personal digital assistant (PDA), or a media playing device with communication capabilities; a desktop device, such as a personal computer or a workstation; a laptop computer; a telephone terminal; or any other communication device or combinations thereof.

UE 101 may include a universal integrated circuit card (UICC) 102. UICC 102 may include information that identifies a particular subscription to system 100 (e.g., a particular customer). UICC 102 may include a CSIM, a USIM, and an ISIM and may need to be activated to allow UE 101 to operate in system 100. UICC 102 may be removed from UE 101 and may be and installed in a new UE.

CDMA access network 122 may include an access network based on, for example, a CDMA2000 standard. For example, CDMA access network may include a CDMA one times radio transmission technology (1XRTT) network, a CDMA HRPD network (which may include a CDMA evolution optimized data only (EV-DO) network), or a CDMA eHRPD network (which may provide access to LTE access network 126).

CDMA access network 122 may include a CDMA base station 112, a packet data service node (PDSN) 121, and a home agent (HA) 132. CDMA base station 112 may include a wireless transceiver and may include functionality necessary to establish a wireless connection between UE 101 and CDMA access network 122. For example, CDMA base station 112 may include a CDMA 1XRTT base station, a CDMA HRPD base station, and/or a CDMA eHRPD base station.

PDSN 121 may provide an access point to and from UE 101 may handle forwarding of data packets for UE 101, and may act as a local anchor point during handover procedures. HA 132 may function as a gateway to an IP network (e.g., core network 140). HA 132 may assign an IP address to UE 101.

GSM access network 124 may include an access network based on a GSM standard. For example, GSM access network 124 may include a General Packet Radio Service (GPRS) network, an Enhanced Data Rates for GSM Evolution (EDGE) network, a Universal Mobile Telecommunications System (UMTS) network (also known as a wideband CDMA (W-CDMA) network), or a High Speed Packet Access (HSPA) network. GSM access network 122 may include GSM base station 114, a Serving General Packet Radio Service (GPRS) Support Node (SGSN) 123, and a Gateway GPRS Support Node (GGSN) 134.

GSM base station 114 may include a wireless transceiver and may include functionality necessary to establish a wireless connection between UE 101 and GSM access network 124. SGSN 123 may provide an access point to and from UE 101 may handle forwarding of data packets for UE 101 and act as a local anchor point during handover procedures. GGSN 134 may function as a gateway to an IP network (e.g., core network 136). GGSN 134 may assign an IP address to UE 101.

LTE access network 126 may include an access network (e.g., an evolved packet core (EPC) network) based on the LTE standard specified by the 3$^{rd}$ Generation Partnership Project (3GPP). LTE access network 126 may include one or more devices that implement logical entities interconnected via standardized interfaces and that provide packet-switched services between UE 101 and core network 140. LTE access network 126 may include an eNodeB 116, a serving gateway (SGW) 125, and a packet data network gateway (PGW) 136.

eNodeB 116 may include a wireless transceiver and may include functionality necessary to establish a wireless connection between UE 101 and LTE access network 126. SGW 125, may provide an access point to and from UE 101 and may handle forwarding of data packets for UE 101, and may act as a local anchor point during hand-over procedures between different eNodeBs. PGW 136 may function as a gateway to an IP network (e.g., core network 140). UE 101, while connected to a single SGW 125, may be connected to multiple PGWs 136 (e.g., one for each IP network with which UE device 101 communicates). PGW 136 may assign an IP address to UE 101.

Core network 140 may allow the delivery of Internet Protocol (IP) broadband services to UE 101, and may interface with other external networks. Core network 140 may include one or more server devices and/or network devices, or other types of computation or communication devices. Core network 140 may include a local area network (LAN), a wide area network (WAN), a metropolitan area network (MAN), an optical network, a cable television network, a satellite television network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks.

In one example implementation, core network 140 may include an IMS network (not shown in FIG. 1). An IMS network may include a network for delivering IP multimedia services as specified by 3GPP and may provide media flows between UE device 101 and external IP networks or external circuit-switched networks (not shown in FIG. 1). Core network 140 may allow CDMA access network 122, GSM access network 124, and LTE access network 126 to communicate with HLR 152, AAA server 154, HSS 156, OTAF 162, back end system 170, provisioning system 180, programming system 190, and SMS center 195.

HLR 152 may include one or more devices that store information about subscribers of CDMA access network 122 and/or GSM access network 124. For example, HLR 152 may store information associated with a UICC associated with a subscriber, services that the subscriber has requested or been assigned and settings associated with the services, and/or a current location of the subscriber.

AAA server 154 may include one or more devices that perform authentication, authorization, and/or accounting in system 100. For example, AAA server 154 may verify a subscriber's identity, authorize access to a particular access network or access to core network 140, authorize a particular service, and/or track consumption of network resources for a particular subscriber.

HSS 156 may include one or more devices that store information about subscribers of LTE access network 126. For example, HSS 156 may store information associated with a UICC associated with a subscriber, services that the subscriber has requested or been assigned and settings associated with the services, and/or a current location of the subscriber.

OTAF 162 may include one or more devices that perform service provisioning in a CDMA 1XRTT network. For example, OTAF 162 may receive a request for service provisioning from UE 101 to access a CDMA 1XRTT access network and may grant access to the CDMA 1XRTT access network to UE 101.

DMD 171 may store information about UE 101 and associate UE 101 with UICC 102. For example, when UICC 102 is installed in a new UE, DMD 171 may receive information about the new UE from provisioning system 180 and store the received information. DMD 171 may store information about capabilities of UE 101 and provide the information about the capabilities of UE 101 to POS 172.

Provisioning system 180 may include one or more devices that perform provisioning services in system 100. For example, provisioning system 180 may request HLR 152, AAA 154, and HSS 156 to create accounts associated with UICC 102 and to store information associated with UICC 102. Furthermore, provisioning system 180 may provide information about UICC 102 to programming system 190 to allow programming system 190 to activate and/or update UICC 102.

Programming system 190 may include one or more devices that perform updates for UICC 102. For example, programming system 190 may receive a request for updates from UICC 102 and may provide updated files for a USIM, ISIM, and CSIM included in UICC 102, as well as application configuration updates for UICC 102.

SMS center 195 may include one or more devices that send and receive SMS messages in system 100. CSCF 196 may include one or more server devices that perform call session control functions for an IMS system associated with core network 140. For example, CSCF 196 may handle signaling, controlling of media paths, and activation of applications. CSCF 196 may interact with HSS 156 to access subscriber information and perform authentication and authorization for a user.

Although FIG. 1 shows example components of system 100, in other implementations, system 100 may include fewer components, different components, differently arranged components, or additional components than depicted in FIG. 1. Additionally or alternatively, one or more components of system 100 may perform the tasks described as being performed by one or more other components of system 100.

Figure 2:
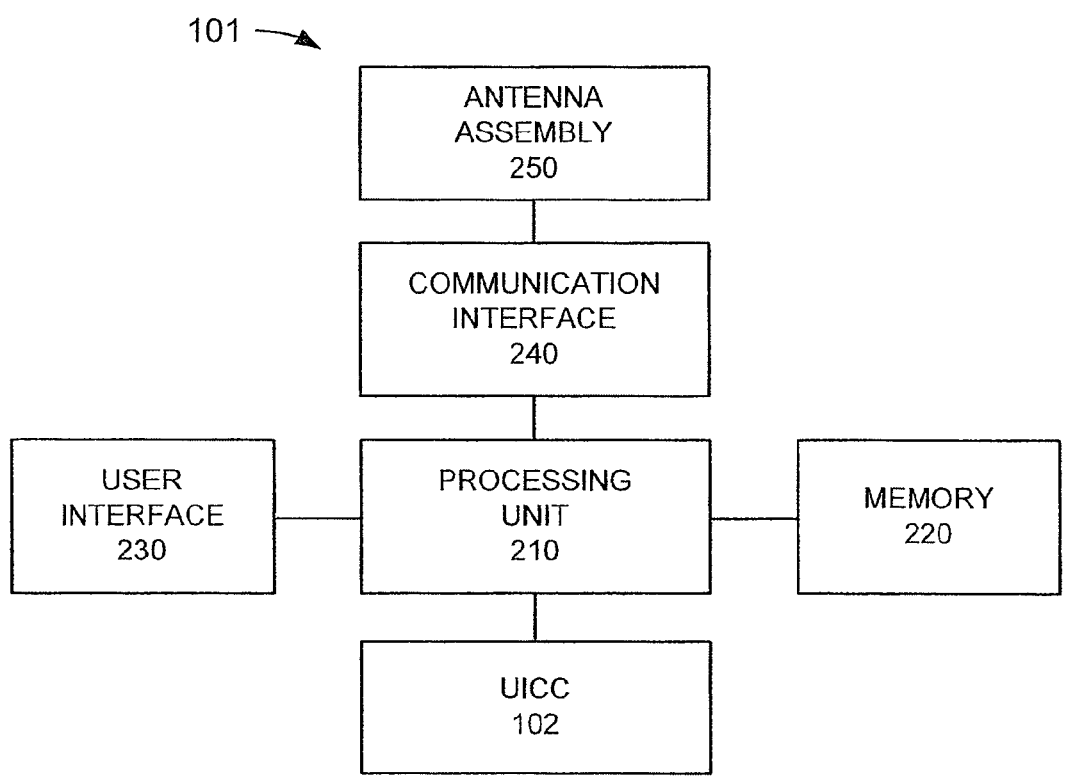
FIG. 2 is a diagram illustrating example components of a UE according to an implementation described herein.

FIG. 2 is a diagram illustrating example components of UE 101 according to an implementation described herein. As shown in FIG. 2, UE 101 may include a processing unit 210, a memory 220, a user interface 230, a communication interface 240, an antenna assembly 250, and UICC 102.

Processing unit 210 may include one or more processors, microprocessors, application specific integrated circuits (ASICs), field programmable gate arrays (FPGAs), or the like. Processing unit 210 may control operation of UE 101 and its components.

Memory 220 may include a random access memory (RAM), a read only memory (ROM), and/or another type of memory to store data and instructions that may be used by processing unit 210.

User interface 230 may include mechanisms for inputting information to UE 101 and/or for outputting information from UE 101. Examples of input and output mechanisms might include a speaker to receive electrical signals and output audio signals; a camera lens to receive image and/or video signals and output electrical signals; a microphone to receive audio signals and output electrical signals; buttons (e.g., a joystick, control buttons, or keys of a keypad) to permit data and control commands to be input into UE 101; a display to output visual information; and/or a vibrator to cause UE 101 to vibrate.

Communication interface 240 may include any transceiver-like mechanism that enables UE 101 to communicate with other devices and/or systems. For example, communication interface 240 may include a modem or an Ethernet interface to a local area network (LAN). Communication interface 240 may also include mechanisms for communicating via a network, such as a wireless network. For example, communication interface 240 may include, for example, a transmitter that may convert baseband signals from processing unit 210 to radio frequency (RF) signals and/or a receiver that may convert RF signals to baseband signals. Alternatively, communication interface 240 may include a transceiver to perform functions of both a transmitter and a receiver. Communication interface 240 may connect to antenna assembly 250 for transmission and/or reception of the RF signals.

Antenna assembly 250 may include one or more antennas to transmit and/or receive RF signals over the air. Antenna assembly 250 may, for example, receive RF signals from communication interface 240 and transmit them over the air and receive RF signals over the air and provide them to communication interface 240. In one implementation, for example, communication interface 240 may communicate with CDMA access network 122, GSM access network 124, LTE access network 126, or with another access network.

As described herein, UE 101 may perform certain operations in response to processing unit 210 executing software instructions contained in a computer-readable medium, such as memory 220. A computer-readable medium may be defined as a physical or logical memory device. A logical memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hardwired circuitry may be used in place of or in combination with software instructions to implement processes described herein. Thus, implementations described herein are not limited to any specific combination of hardware circuitry and software.

Processing unit 210 may communicate with UICC 102. For example, processing unit 210 may receive instructions from UICC 102 and may perform the received instructions. For example, UICC 102 may instruct processing unit 210 to provide particular information to a particular component of system 100 via communication interface 240 and/or to request particular information from a particular component of system 100. As another example, processing unit 210 may receive, via communication interface 240, particular information for UICC 102 from a particular component of system 100 and/or may receive a request for particular information from UICC 102 from a particular component of system 100. As yet another example, when UE 101 powers up, UICC 102 may take control and may instruct processing unit 210 to perform one or more operations.

Although FIG. 2 shows example components of UE 101, in other implementations, UE 101 may include fewer components, different components, differently arranged components, or additional components than depicted in FIG. 2. Additionally or alternatively, one or more components of UE 101 may perform the tasks described as being performed by one or more other components of UE 101.

Figure 3A:
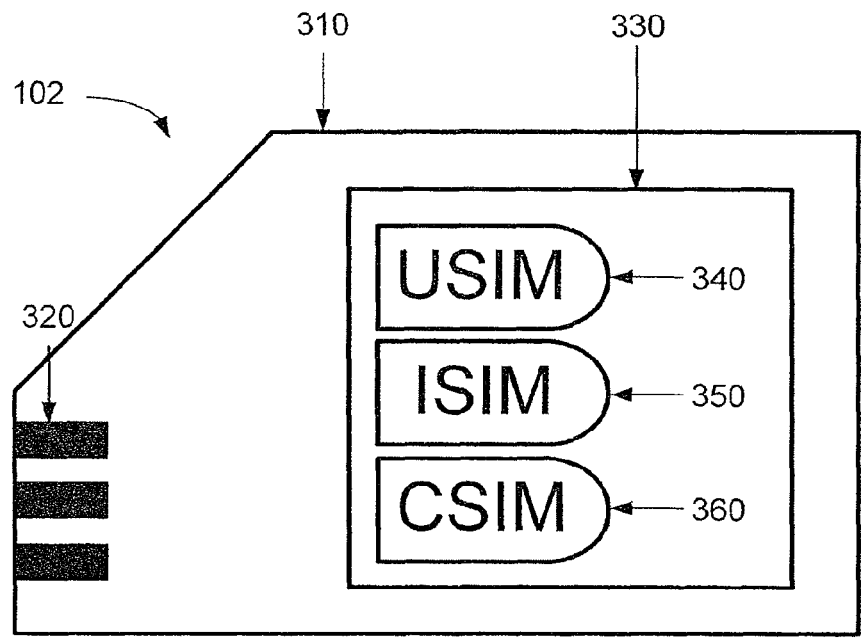
FIG. 3A is a diagram illustrating example components of the universal integrated circuit card (UICC) depicted in FIG. 2.

FIG. 3A is a diagram illustrating example components of UICC 102. As shown in FIG. 3A, UICC 102 may include a housing 310, contacts 320, and an integrated circuit (IC) area 330. Housing 310 may protect IC area 330 from outside elements. Housing 310 may include a structure configured to hold contacts 320 and IC area 330, and may be formed from a variety of materials. For example, housing 330 may be formed from plastic, metal, or a composite. Contacts 320 may include one or more contacts to electronically connect UICC 102 to UE 101. Contacts 320 may include a power contact to supply electrical power from UE 101 to UICC 102.

IC area 330 may include a Universal SIM (USIM) 340, an IMS SIM (ISIM) 350, and a CDMA SIM (CSIM) 360. USIM 340 may store subscriber information and authentication information for accessing GSM access network 124 and for accessing LTE access network 126. USIM 340 may also include storage space for SMS messages and contacts. ISIM 350 may store a subscriber's IMS identity, such as a public IMS identity and a private IMS identity. CSIM 360 may store subscriber information and authentication information for accessing CDMA access network 122.

Although FIG. 3A shows example components of UICC 102, in other implementations, UICC 102 may include fewer components, different components, differently arranged components, or additional components than depicted in FIG. 3A. Additionally or alternatively, one or more components of UICC 102 may perform the tasks described as being performed by one or more other components of UICC 102.

Figure 3B:
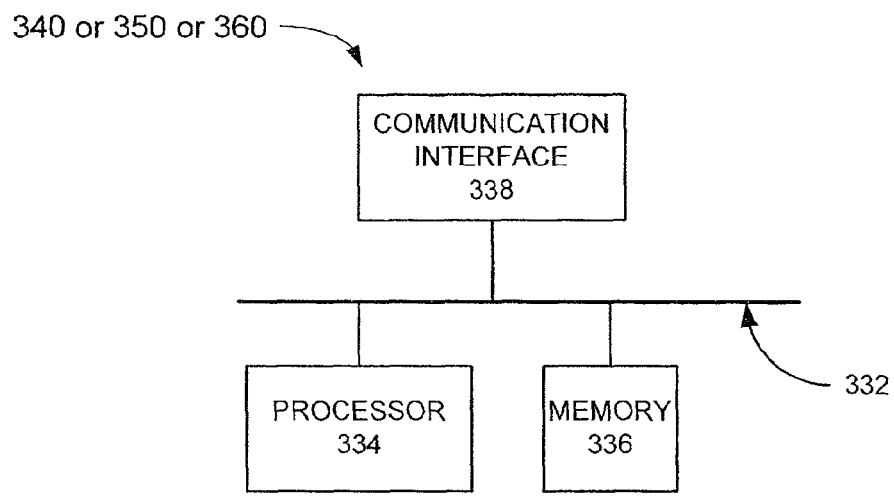
FIG. 3B is a diagram illustrating example components of the Universal SIM (USIM), Internet Protocol Multimedia Subsystem SIM (ISIM), or Code Division Multiple Access SIM (CDMA) depicted in FIG. 3A.

FIG. 3B is a diagram illustrating example components of USIM 340, ISIM 350, or CSIM 360. As shown in FIG. 3B, USIM 340, ISIM 350, or CSIM 360 may include a bus 332, a processor 334, a memory 336, and a communication interface 338.

Bus 332 may include a path that permits communication among the components of USIM 340, ISIM 350, or CSIM 360. Processor 334 may include one or more processors, microprocessors, or processing logic (e.g., ASICs or FPGAs) that may interpret and execute instructions. Memory 336 may include a RAM device or another type of dynamic storage device that may store information and instructions for execution by processor 334 or a ROM device or another type of static storage device that may store static information and instructions for use by processor 334. Communication interface 338 may include any interface mechanism that enables, USIM 340, ISIM 350, or CSIM 360 to communicate with UE 101.

As will be described in detail below, USIM 340, ISIM 350, or CSIM 360 may perform certain operations. USIM 340, ISIM 350, or CSIM 360 may perform these operations in response to processor 334 executing software instructions contained in a computer-readable medium, such as memory 336.

The software instructions may be read into memory 336 from another computer-readable medium, or from another device via communication interface 338. The software instructions contained in memory 336 may cause processor 334 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3B shows example components of USIM 340, ISIM 350, or CSIM 360, in other implementations, USIM 340, ISIM 350, or CSIM 360 may include fewer components, different components, differently arranged components, or additional components than depicted in FIG. 3B. Additionally or alternatively, one or more components of USIM 340, ISIM 350, or CSIM 360 may perform the tasks described as being performed by one or more other components of USIM 340, ISIM 350, or CSIM 360.

Figure 4:
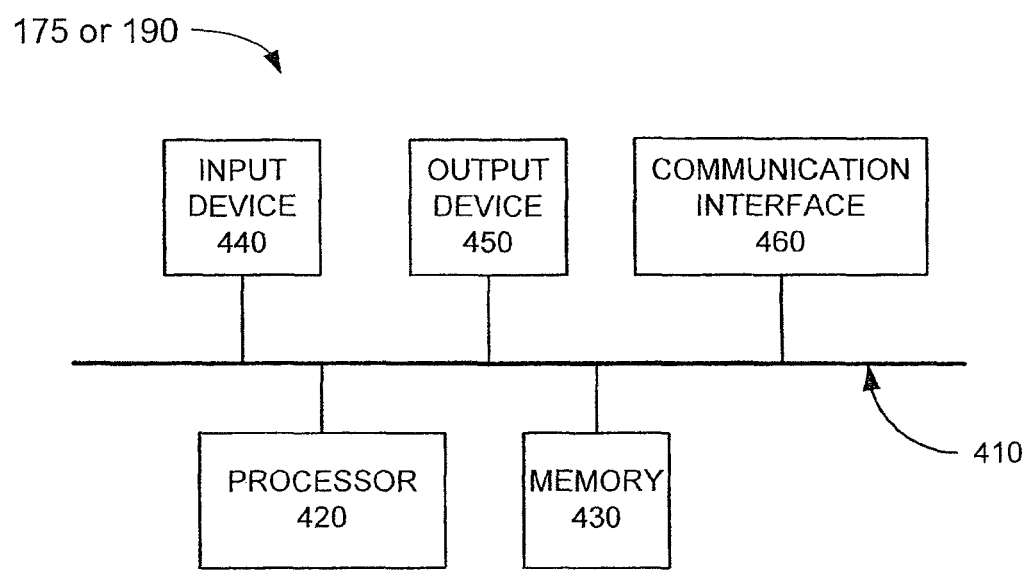
FIG. 4 is a diagram illustrating example components of the billing system, provisioning system, or programming system of FIG. 1.

FIG. 4 is a diagram illustrating example components of billing system 175, provisioning system 180, or programming system 190. As shown in FIG. 4, billing system 175, provisioning system 180, or programming system 190 may include a bus 410, a processor 420, a memory 430, an input device 440, an output device 450, and a communication interface 460.

Bus 410 may include a path that permits communication among the components of billing system 175, provisioning system 180, or programming system 190. Processor 420 may include one or more processors, microprocessors, or processing logic (e.g., ASICs or FPGAs) that may interpret and execute instructions. Memory 430 may include a RAM device or another type of dynamic storage device that may store information and instructions for execution by processor 420, a ROM device or another type of static storage device that may store static information and instructions for use by processor 420, a magnetic and/or optical recording memory device and its corresponding drive, and/or a removable form of memory, such as a flash memory.

Input device 440 may include a mechanism that permits an operator to input information to billing system 175, provisioning system 180, or programming system 190, such as a keypad, a button, a pen, a touch screen, voice recognition and/or biometric mechanisms, etc. Output device 450 may include a mechanism that outputs information to the operator, such as a display, a speaker, etc. Communication interface 460 may include any transceiver-like mechanism that enables billing system 175, provisioning system 180, or programming system 190 to communicate with other devices and/or systems. For example, communication interface 460 may include a modem, a network interface card, or a wireless interface card.

As will be described in detail below, billing system 175, provisioning system 180, or programming system 190 may perform certain operations. Billing system 175, provisioning system 180, or programming system 190 may perform these operations in response to processor 420 executing software instructions contained in a computer-readable medium, such as memory 430.

The software instructions may be read into memory 430 from another computer-readable medium, or from another device via communication interface 460. The software instructions contained in memory 430 may cause processor 420 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows example components of billing system 175, provisioning system 180, or programming system 190, in other implementations, billing system 175, provisioning system 180, or programming system 190 may include fewer components, different components, additional components, or differently arranged components than depicted in FIG. 4. Additionally or alternatively, one or more components of billing system 175, provisioning system 180, or programming system 190 may perform one or more tasks described as being performed by one or more other components of billing system 175, provisioning system 180, or programming system 190.

Figure 5A:
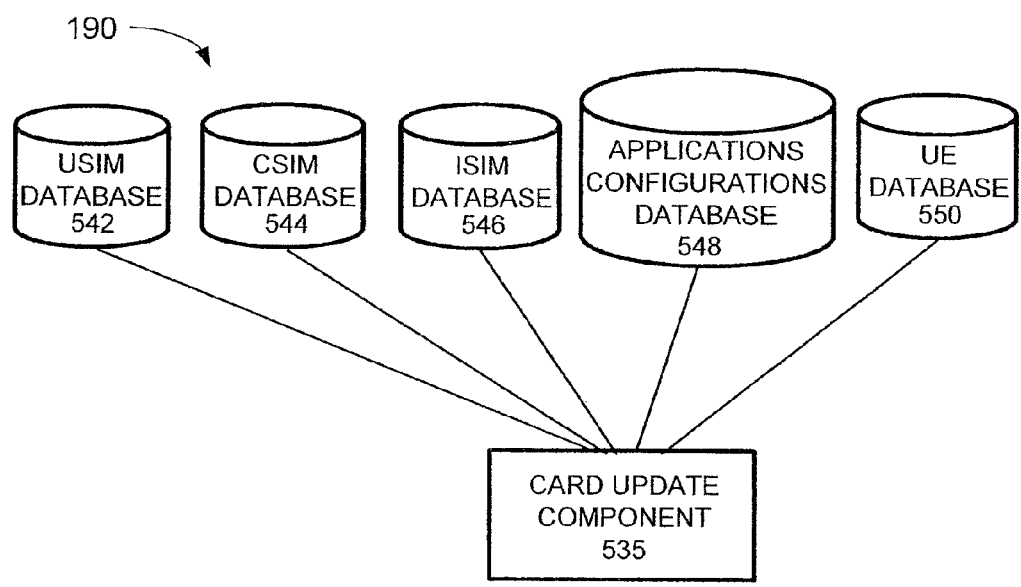
FIG. 5A is a diagram illustrating example functional components of the programming system of FIG. 1.

FIG. 5A is a diagram illustrating example functional components of programming system 190. As shown in FIG. 5A, programming system 190 may include a card update component 535, a USIM database 542, a CSIM database 544, a ISIM database 546, an application configuration database 548, and a UE database 550.

Card update component 535 may perform updates for UICC 102. For example, upon receive a polling request from UICC 102, card update component 535 may provide, to UICC 102, information stored in USIM database 542, CSIM database 544, ISIM database 546, and/or application configuration database 548. Card update component 535 may receive information from UICC 102 about UE 101 and store the received information in UE database 550.

USIM database 542 may store files that are to be provided to USIM 340 while performing updates of UICC 102. ISIM database 544 may store files that are to be provided to ISIM 350 while performing updates of UICC 102. CSIM database 546 may store files that are to be provided to CSIM 360 while performing updates of UICC 102. Application configuration database 548 may store application configuration files that are to be provided to UICC 102 while performing updates of UICC 102. UE database 550 may store information about UE 101 that may be received from UICC 102 while performing updates of UICC or after UICC is placed into a new UE. Furthermore, UE database 550 may store a last date at which UICC 102 was updated.

Although FIG. 5A shows example functional components of programming system 190, in other implementations, programming system 190 may include fewer functional components, different functional components, differently arranged functional components, or additional functional components than depicted in FIG. 5A. Additionally or alternatively, one or more functional components of programming system 190 may perform one or more other tasks described as being performed by one or more other functional components of programming system 190.

Figure 5B:
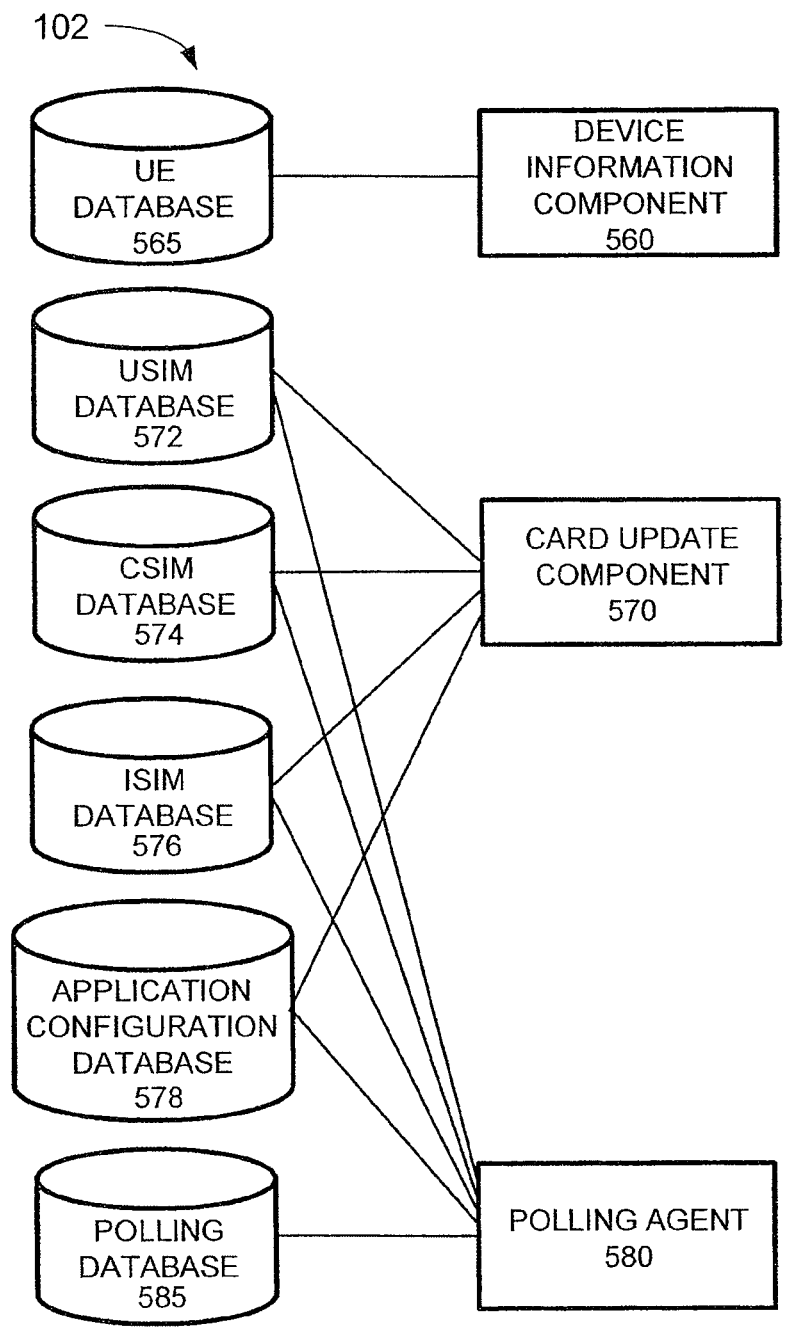
FIG. 5B is a diagram illustrating example functional components of the UICC depicted in FIG. 3A.

FIG. 5B is a diagram illustrating example functional components of UICC 102. As shown in FIG. 5B, UICC 102 may include a device information component 560, a UE database 565, a card update component 570, a USIM database 572, a CSIM database 574, an ISIM database 576, an application configuration database 578, a polling agent 580, and a polling database 585.

Device information component 560 may determine information associated with UE 101 and store the information in UE database 565. UE database 565 may store information associated with UE 101. Example fields that may be stored in UE database 565 are described below with reference to FIG. 6. Card update component 570 may send a request for updates of UICC 102 to programming system 190, may receive file updates from programming system 190, and may store the file updates in USIM database 572, CSIM database 574, ISIM database 576, and application configuration database 578.

USIM database 572 may store information used by UICC 102 during communication with GSM access network 124 or LTE access network 126. CSIM database 574 may store information used by UICC 102 during communication with CDMA access network 122. ISIM database 576 may store information used by UICC 102 during communication with an IMS network. Application configuration database 578 may store information about associated with particular applications and/or settings associated with UE 101. Example fields that may be stored in USIM database 572, CSIM database 574, ISIM database 576, and application configuration database 578 are described below with reference to FIG. 6.

Polling agent 580 may detect, based on accessing polling database 585, a trigger event for requesting that UICC 102 be updated and may send a polling request for updates to programming system 190. Polling agent 580 may receive file updates from programming system 190 and may update USIM database 572, CSIM database 574, ISIM database 576, and application configuration database 578 based on the received file updates. Polling database 585 may store information about trigger events for requesting updates. For example, polling database 585 may store particular dates and times when polling agent 580 is to request an update.

Although FIG. 5B shows example functional components of UICC 102, in other implementations, UICC 102 may include fewer functional components, different functional components, differently arranged functional components, or additional functional components than depicted in FIG. 5B. Additionally or alternatively, one or more functional components of UICC 102 may perform one or more other tasks described as being performed by one or more other functional components of UICC 102.

Figure 6:
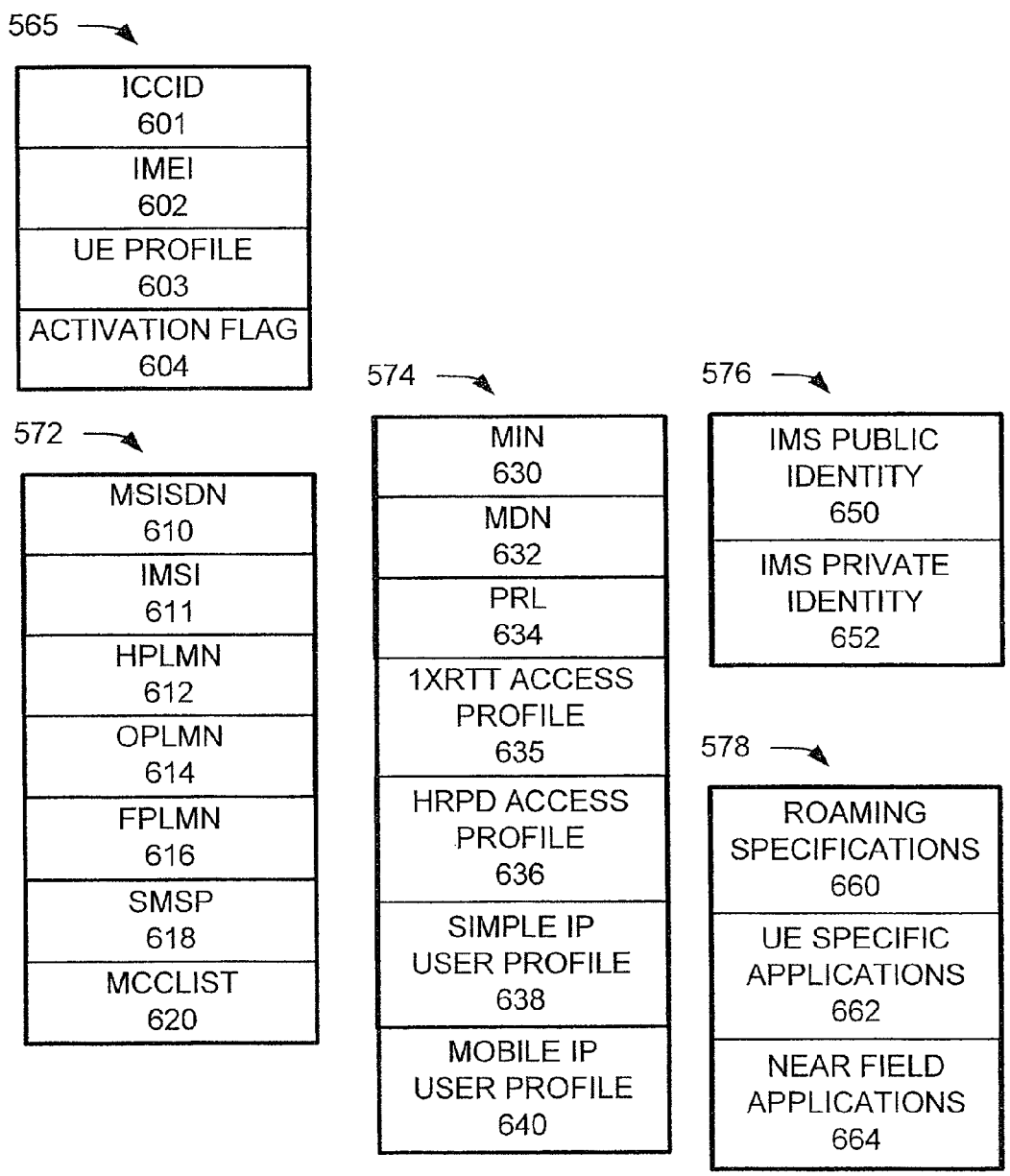
FIG. 6 is a diagram of example fields that may be stored within the databases depicted in FIG. 5B according to an implementation described herein.

FIG. 6 is a diagram of example fields that may be included within the databases depicted in FIG. 5C. As shown in FIG. 6, UE database 565 may include an Integrated Circuit Card Identification (ICCID) field 601, an International Mobile Equipment Identification (IMEI) field 602, a UE profile 603, and an activation flag field 604.

ICCID field 601 may store an ICCID associated with UICC 102. The ICCID may include a string that uniquely identifies UICC 102 to system 100. IMEI field 602 may include an IMEI associated with UE 101. The IMEI may uniquely identify UE 101 to system 100. Additionally or alternatively, IMEI field 602 may store an IMEI and a software version associated with UE 101 (IMEI_SV). UE profile 603 may store information associated with UE 101, such as capabilities of UE 101 and/or metrics associated with UE 101 that may be used by system 100 to optimize the performance of UE 101. Activation flag field 604 may store a flag that indicates whether UICC 102 has been activated. For example, if UICC 102 has been activated, activation flag field 604 may be set.

As shown in FIG. 6, USIM database 572 may include an MSISDN field 610, an IMSI field 611, a home public land mobile network (HPLMN) field 612, an operation PLMN (OPLMN) field 614, a forbidden PLMN (FPLMN) field 616, an SMS platform (SMSP) field 618, and a mobile country code list (MCCLIST) field 620.

MSISDN field 610 may store an MSISDN associated with the user of UICC 102. The MSISDN may uniquely identify a subscription to system 100. IMSI field 611 may store an IMSI number associated with UICC 102. The IMSI number may uniquely identify a user to system 100. The IMSI number may include an MCC that identifies a country associated with the user and a Mobile Network Code (MNC) associated with the user.

HPLMN field 612 may store a HPLMN (e.g., service provider) associated with the user of UICC 102. OPLMN field 614 may store an OPLMN (e.g., a PLMN associated with administrative and monitoring functions) associated with the user of UICC 102. FPLMN field 616 may store a FPLMN (e.g., a PLMN accessible only during emergencies) associated with the user of UICC 102. SMSP field 618 may identify SMS center 195. MCCLIST field 620 may identify a list of countries in which UICC 102 may operate.

As shown in FIG. 6, CSIM database 574 may include a MIN field 630, a mobile directory number (MDN) field 632, a preferred roaming list (PRL) field 634, a 1XRTT access profile field 635, an HRPD access profile field 636, a simple IP user profile 638, and a mobile IP user profile 640.

MIN field 630 may store an MIN associated with UE 101 and may be derived from the MDN assigned to UE 101. MDN field 632 may store an MDN associated with a subscription in system 100, associated with UE 101, and may correspond to the actual 10 digit number dialed to reach UE 101. PRL field 634 may store a PRL associated with UE 101. The PRL may specify which bands, sub-bands, and/or service provider identifiers will be scanned and in what priority order. 1XRTT access profile field 635 may store information used to access a CDMA 1XRTT network. For example, 1XRTT access profile field 635 may store an OTASP number used to reach OTAF 162. HRPD access profile field 636 may store information used to access a CDMA HRPD network. For example, HRPD access profile field 636 may store a special NAI used to bypass authentication in an HRPD network while performing UICC updates. Simple IP user profile 638 and mobile IP user profile 640 may store settings for CDMA simpleIP and mobileIP protocols, which may allow UE 101 to maintain IP connectivity while roaming.

ISIM database 576 may include an IMS public identity field 650, and an IMS private identity field 652. IMS public identity field 650 may include a user's public IMS identity. The public IMS identity may be used to communicate with other users in an IMS network. IMS private identity field 652 may store a user's private IMS identity. The private IMS identity may be assigned by a home network operator and may be used registration and AAA functions in an IMS network.

Application configuration database 578 may include a roaming specifications field 660, a UE specific applications field 662, and a near field applications field 664. Roaming specifications field 660 may include roaming specifications associated with UICC 102. UE specific applications field 662 may include information associated with particular applications associated with UE 101. Near field applications field 664 may include information associated with near field applications, such as, for example, applications facilitating purchases at retail stores, vending machines, public transportation points of sale, etc.

Although FIG. 6 shows example fields of USIM database 572, CSIM database 574, ISIM database 576, and application configuration database 578, in other implementations, USIM database 572, CSIM database 574, ISIM database 576, and application configuration database 578 may contain fewer fields, different fields, additional fields, or differently arranged fields than depicted in FIG. 6. Additionally or alternatively, one or more fields of USIM database 572, CSIM database 574, ISIM database 576, and application configuration database 578 may include information described as being included in one or more other fields of USIM database 572, CSIM database 574, ISIM database 576, and application configuration database 578.

Figure 7:
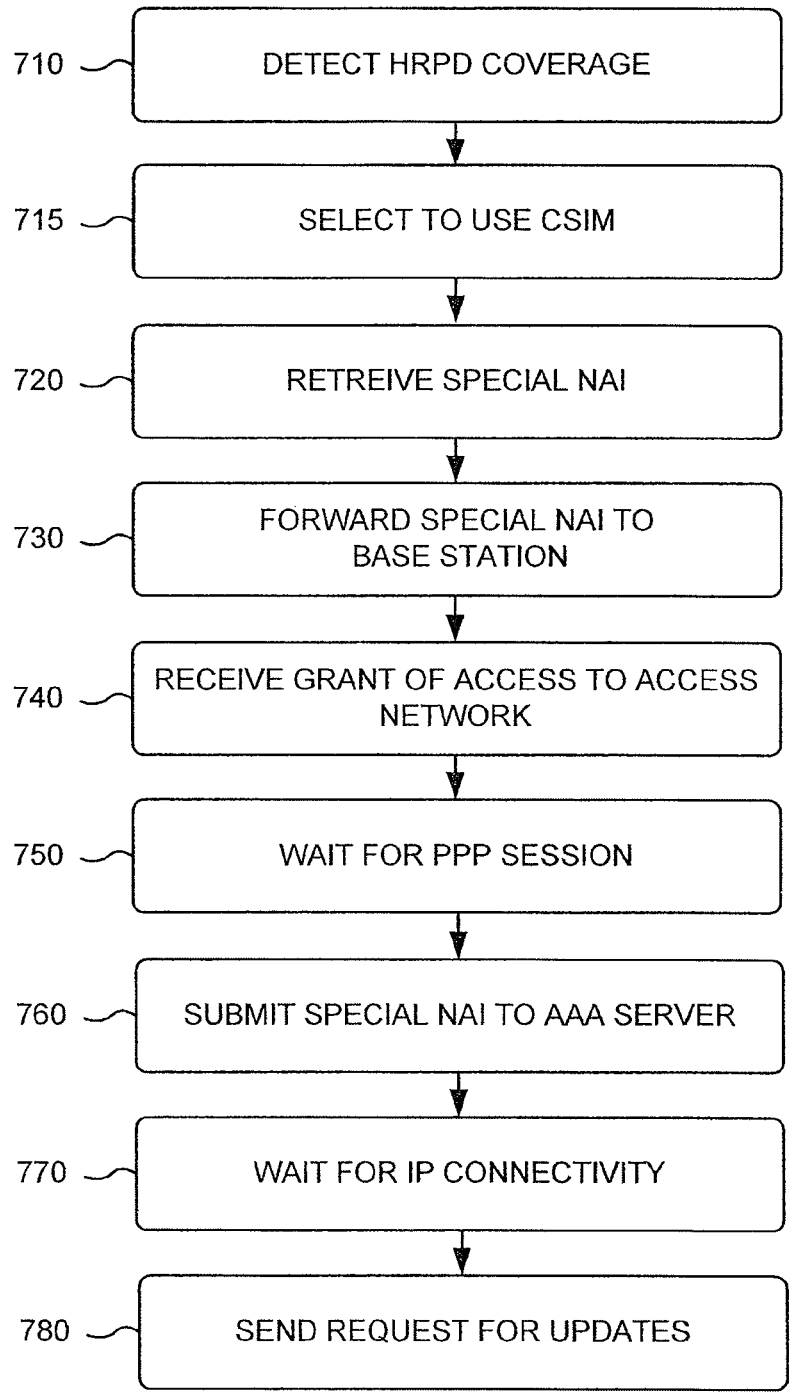
FIG. 7 is a flow diagram illustrating an example process of authentication bypass under High Rate Packet Data (HRPD) coverage, performed by the UICC, according to an implementation described herein.

FIG. 7 is a flow diagram illustrating an example process of authentication bypass under HRPD coverage according to an implementation described herein. In one implementation, the process of FIG. 7 may be performed by UICC 102. In other implementations, some or all of the process of FIG. 7 may be performed by another device or a group of devices separate from or including UICC 102.

The process of FIG. 7 may be used by UICC 102 to bypass authentication using a special network access identifier (NAI) under HRPD coverage. AAA server 154, as well as an access network AAA (AN-AAA) server may allow the special NAI to bypass authentication. An AN-AAA server (which is not shown in FIG. 1 and which is shown together with AAA server 154 in FIGS. 11 and 13) may perform AAA functions for CDMA access network 122. In one implementation, the functionality of the AN-AAA server may be performed by AAA server 154. In another implementation, AN-AAA server may be implemented separately from AAA server 154.

The process of FIG. 7 may include detecting HRPD coverage (block 710). For example, UE 101 may power up a radio link and search for coverage. UE 101 may detect HRPD coverage by communicating with an HRPD base station, and may notify UICC 102 that HRPD coverage is available. UICC 102 may select to use CSIM 360 in response to detecting HRPD coverage (block 715).

A special NAI may be retrieved (block 720). For example, CSIM 360 may retrieve a special NAI from HRPD access profile field 636 of CSIM database 574. The special NAI may be forwarded to a base station (block 730). For example, CSIM 360 may instruct UE 101 to provide the special NAI to CDMA base station 112.

A grant of access to an access network may be received (block 740). For example, CSIM 360 may receive a grant of access, via CDMA base station 112, to access PDSN 121 of CDMA network 122. Waiting may occur for the establishment of a Point-to-Point Protocol (PPP) session (block 750). For example, once access to PDSN 121 is granted, UE 101 may request a PPP session, and a PPP session may be set up by PDSN 121. Once the PPP session is set up, the special NAI may be submitted to AAA server 154 (block 760). For example, CSIM 360 may instruct UE 101 to submit the special NAI to AAA server 154.

Waiting may occur for IP connectivity (block 770). For example, once the special NAI has been submitted to the AAA server, CSIM 360 may wait for IP connectivity to be established for UE 101. A request for updates may be sent (block 780). For example, once CSIM 360 detects IP connectivity, CSIM 360 may send request for updates to programming system 190 to update UICC 102.

Figure 8:
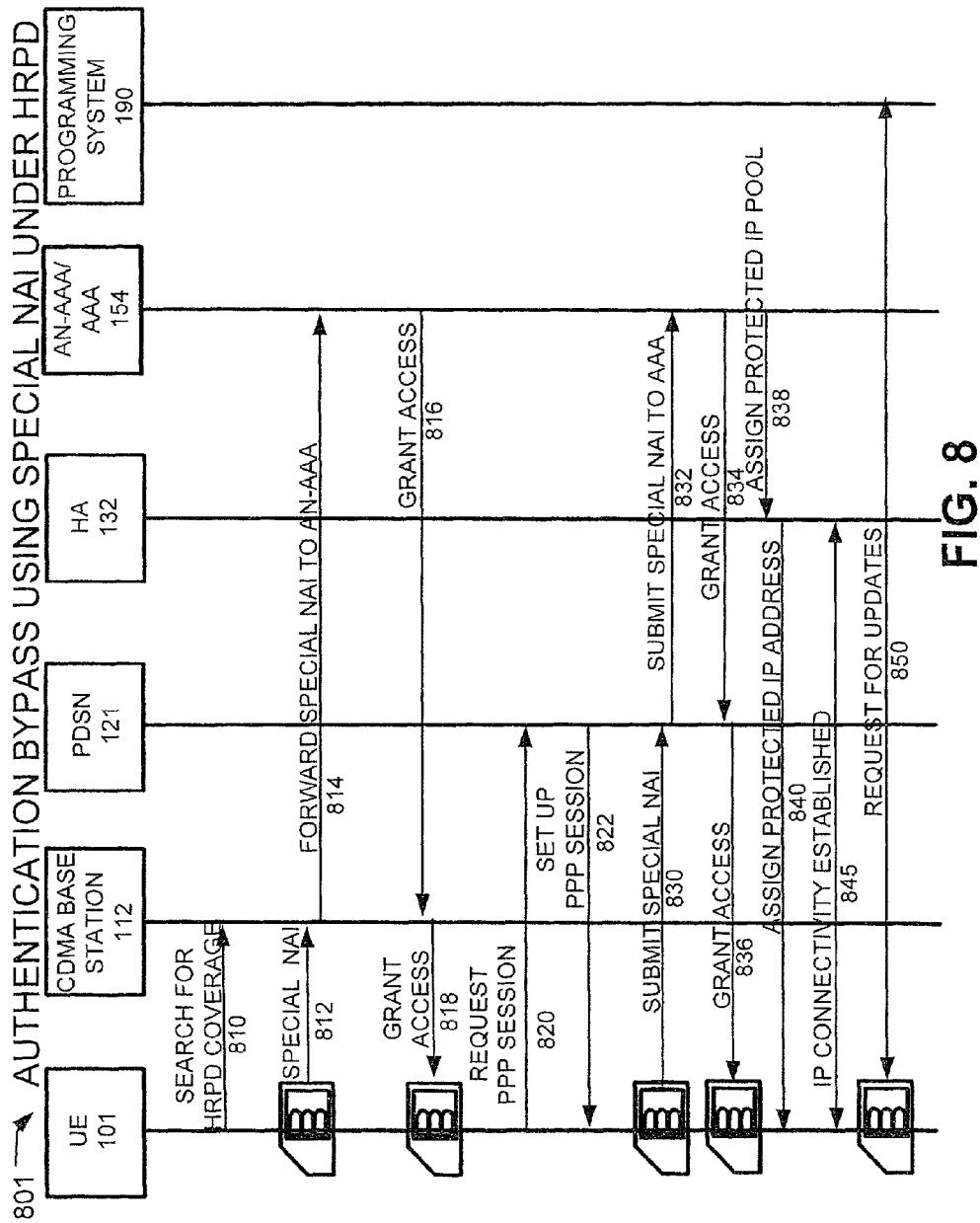
FIG. 8 is a diagram illustrating an example signal flow of the authentication bypass under HRPD coverage according to an implementation described herein.

FIG. 8 is a diagram illustrating an example signal flow 801 of the authentication bypass under HRPD coverage according to an implementation described herein. Signal flow 801 illustrates the processes of FIG. 8 in the context of system 100. Signal flow 801 may include UE 101 searching for HRPD coverage and contacting CDMA base station 112, which in this case corresponds to an HRPD base station (signal 810). After informing UICC 102 of HRPD coverage, CSIM 360 may send special NAI to CDMA base station 112 (signal 812).

CDMA base station 112 may forward the special NAI to an AN-AAA server (signal 814). AN-AAA server may grant access to CDMA network 122, via CDMA base station 112, to UE 101 (signals 816 and 818).

UE 101 may request a PPP session with PDSN 121 (signal 820) and PDSN 121 may establish a PPP session between UE 101 and PDSN 121 (signal 822). Once the PPP session is established, UICC 102 may be able to communicate with AAA server 154. UICC 102 may submit the special NAI to PDSN 121 (signal 830), and PDSN 121 may submit the special NAI to AAA server 154 (signal 832). AAA server may grant access to UE 101 via PDSN 121 (signals 834 and 836). Additionally, AAA server 154 may assign a protected IP pool to HA 132 (signal 838), and HA 132 may select an IP address from the protected IP pool and assign the selected IP address to UE 101 (signal 840). Once an IP address is assigned to UE 101, IP connectivity between UE 101 and HA 132 may be established (signal 845). UICC 102 may now contact programming system 190 with a request for updates (signal 850).

Figure 9:
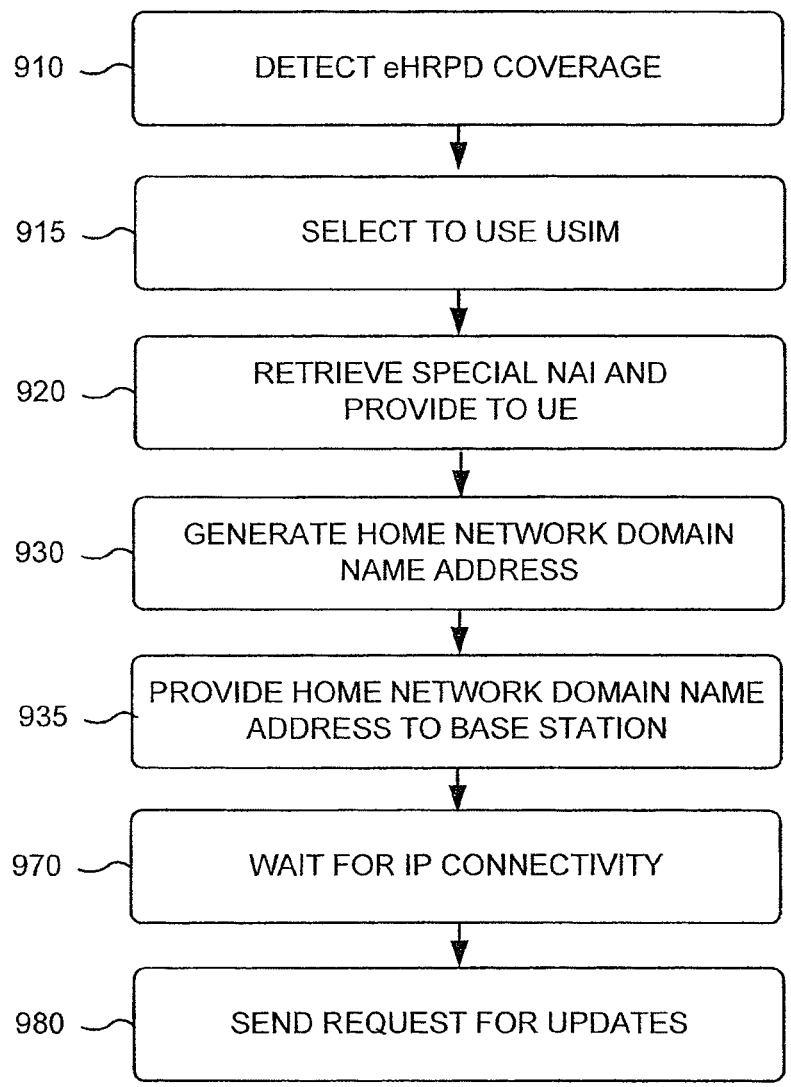
FIG. 9 is a flow diagram illustrating an example process of authentication bypass under enhanced HRPD coverage, performed by the UICC, according to an implementation described herein.

FIG. 9 is a flow diagram illustrating an example process of authentication bypass under eHRPD coverage according to an implementation described herein. In one implementation, the process of FIG. 9 may be performed by UICC 102. In other implementations, some or all of the process of FIG. 9 may be performed by another device or a group of devices separate from or including UICC 102.

The process of FIG. 9 may be used by UICC 102 to bypass authentication using a special network access identifier (NAI) under eHRPD coverage. The process of FIG. 9 may include detecting eHRPD coverage (block 910). For example, UE 101 may power up a radio link and search for coverage. UE 101 may detect eHRPD coverage by communicating with an eHRPD base station, and may notify UICC 102 that eHRPD coverage is available. UICC 102 may select to use USIM 340 in response to detecting eHRDP coverage (block 915).

A special network access identifier (NAI) may be retrieved and provided to UE 101 (block 920). For example, USIM 340 may retrieve a special NAI from eHRPD access profile field 625 of USIM database record 601 and provide the special NAI to UE 101. A home network domain name address may be created based on an IMSI associated with UICC 102 (block 930) and forwarded to the base station (block 935). For example, USIM 340 may generate a home network domain name address of the form 6<IMSI>@nai.epc.mcn<MNC>.mcc<MCC>. 3gppnetwork.org, where <IMSI> is the IMSI associated with UICC 102, <MNC> is the mobile network code included in the IMSI, and <MCC> is the mobile country code included in the IMSI; and forward the generated home network domain name address to the base station.

Waiting may occur for IP connectivity (block 970). For example, once the special NAI has been submitted to the base station, USIM 340 may wait for IP connectivity to be established for UE 101. A request for updates may be sent (block 980). For example, once USIM 340 detects IP connectivity, USIM 340 may send a request for updates to programming system 190 to update UICC 102.

FIG. 10 is a diagram illustrating an example signal flow 1001 of the authentication bypass under eHRPD coverage according to an implementation described herein. Signal flow 1001 illustrates the processes of FIG. 9 in the context of system 100. Signal flow 1001 may include UE 101 searching for eHRPD coverage and contacting eNodeB 116, which in this case corresponds to an eHRPD base station (signal 1005). After informing UICC 102 of eHRPD coverage, UE 101 may send special NAI to eNodeB 116 and an authentication bypass may be set up between UE 101 and an AN-AAA server (signal 1010).

UICC 102 may now be able to contact AAA server 154 via SGW 125. UICC 102 may send a generated home network domain name address to AAA server 154 (signal 1020). Based on the received home network domain name address, AAA server 154 may assign an administrative IP pool to PGW 136 (signal 1030). PGW 136 may select an IP address from the administrative IP pool and assign the IP address to UE 101 (signal 1035).

UE 101 may request a PPP session with PGW 136 (signal 1040) and PGW 136 may set up a PPP session between UE 101 and PGW 136 (signal 1042). IP connectivity between UE 101 and PGW 136 may now be established (signal 1044). UICC 102 may now send a request for updates to programming system 190 to update UICC 102 (signal 1050).

Figure 11A:
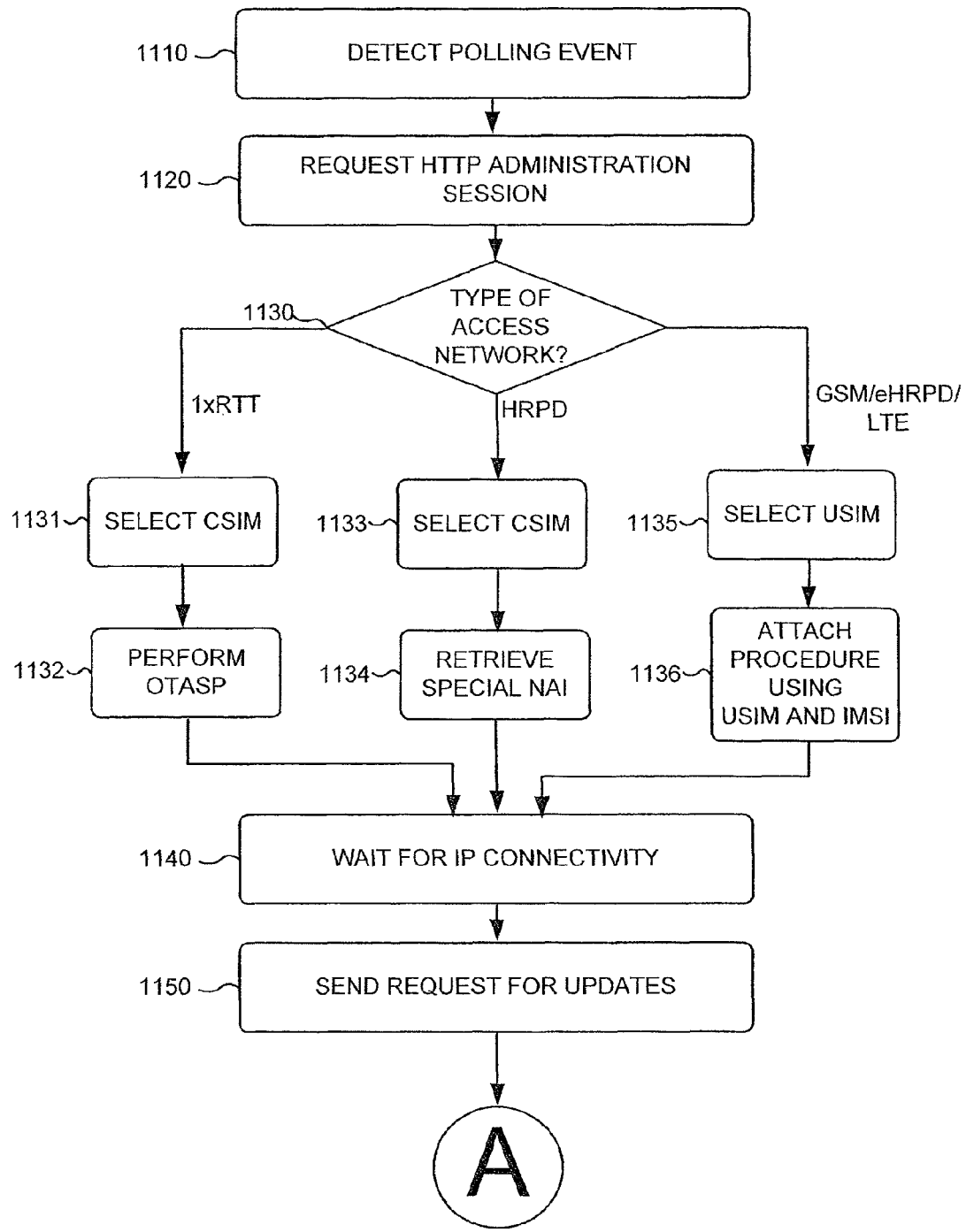
FIGS. 11A and 11B are flow diagrams illustrating an example process of performing UICC updates, performed by the UICC, according to an implementation described herein.
Figure 11B:
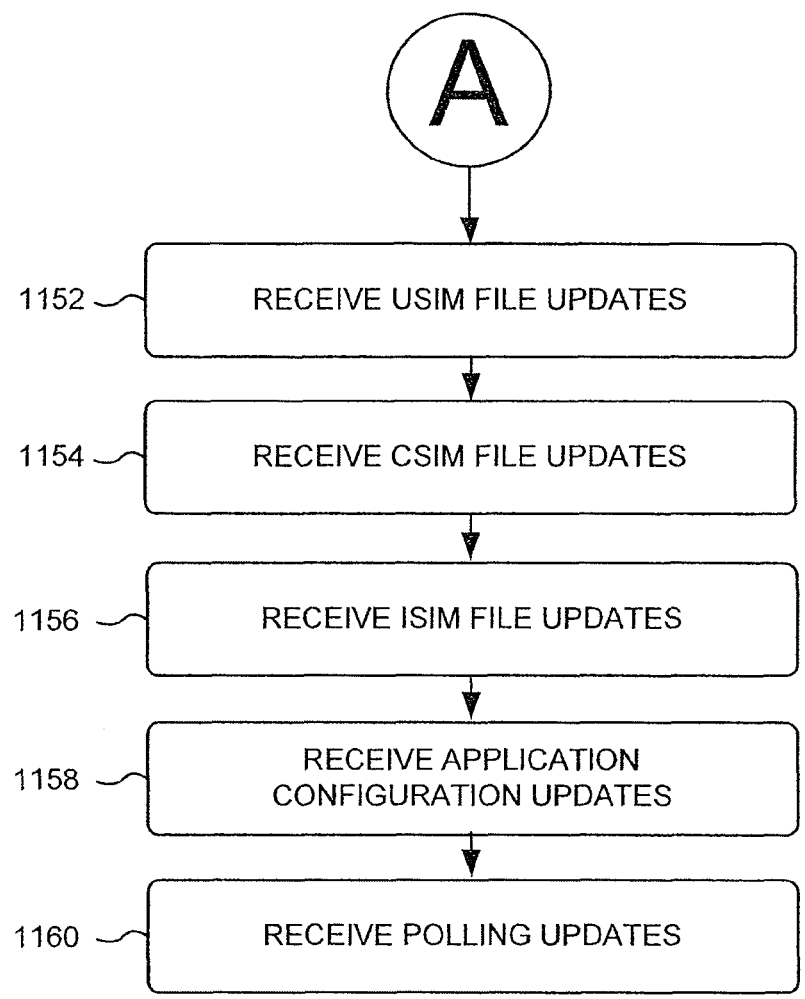

FIGS. 11A and 11B are flow diagrams illustrating an example process of performing UICC updates according to an implementation described herein. In one implementation, the process of FIGS. 11A and 11B may be performed by UICC 102. In other implementations, some or all of the process of FIGS. 11A and 11B may be performed by another device or a group of devices separate from or including UICC 102.

The process of FIG. 11A may include detecting a polling event (block 1110). For example, in one implementation, UICC 102 may be configured to send a polling request to request updates at particular intervals, which may be stored in polling database 585. In another implementation, UICC 102 may be configured to send a polling request in response to a particular trigger event, such as, for example, a change in a particular variable associated with UE 101.

In response to detecting the polling event, a new HTTP administration session may be requested (block 1120). For example, UICC 102 may request UE 101 to set up an HTTP administration session with core network 140 so that UICC 102 may be activated.

A type of access network may be determined (block 1130). For example, UICC 102 may query UE 101 to determine what kind of coverage is available. UE 101 may power up an RF transceiver and scan for base stations. Once UE 101 has detected a base station, UE 101 may identify a type of base station and provide information about the base station to UICC 102.

If an 1XRTT base station is detected (block 1130—1XRTT), CSIM 360 may be selected for performing updates (block 1131) and over the air service provisioning (OTASP) may be performed (block 1132). For example, card update component 570 may select CSIM 360 to be used for updates and CSIM 360 may retrieve an OTAF number stored in 1XRTT profile field 635 of CSIM database 572. The OTAF number may be provided to UE 101 and may be used to contact OTAF 162. OTAF 612 may perform an OTASP transaction, which may include providing UICC 102 with a mobile IMSI (IMSI_M). The provided IMSI_M may be used by UICC 102 to perform HLR authentication by contacting HLR 152. Once HLR 152 is contacted, waiting for IP connectivity may occur (block 1140).

If an HRPD base station is detected (block 1130—HRPD), CSIM 360 may be selected for performing updates (block 1133) and a special NAI may be retrieved (block 1134). For example, card update component 570 may select CSIM 360 to be used for performing updates and CSIM 360 may retrieve a special NAI stored in HRPD profile field 636 of CSIM database 572. The special NAI may be provided to UE 101 and waiting for IP connectivity may occur (block 1140).

If a GSM, eHRPD, or an LTE base station is detected (block 1130—GSM/eHRPD/LTE), USIM 340 may be selected for performing updates (block 1135) and an attach procedure using USIM 340 and IMSI may be performed (block 1136). For example, UICC 102 may provide the IMSI to UE 101 and waiting for IP connectivity may occur (block 1140).

Once IP connectivity is established, a polling request may be sent (block 1150). For example, UICC 102 may send a polling request to programming system 190 to determine whether updates need to be performed on UICC 102.

Continuing at FIG. 11B, USIM file updates may be received (block 1152). For example, USIM 340 may receive USIM file updates and store the updates in USIM database 572. The USIM file updates may include, for example, updates to any fields of USIM database 572.

CSIM file updates may be received (block 1154). For example, CSIM 360 may receive CSIM file updates and store the updates in CSIM database 574. The CSIM file updates may include, for example, updates to any fields of CSIM database 574.

ISIM file updates may be received (block 1156). For example, ISIM 350 may receive ISIM file updates and store the updates in ISIM database 576. The ISIM file updates may include, for example, updates to any fields of ISIM database 576.

Application configuration updates may be received (block 1158). For example, UICC 102 may receive application configuration updates and store the updates in application configuration database 578. Application configuration updates may include, for example, updates to any fields of application configuration database 578.

Polling updates may be received (block 1160). For example, UICC 101 may receive polling updates that indicate particular conditions that may cause UICC 102 to request updates from programming system 190. The particular conditions may include, for example, particular intervals at which updates are to be performed, or particular trigger events that may cause UICC 102 to request an update. The received polling updates may be stored in polling database 585.

Figure 12:
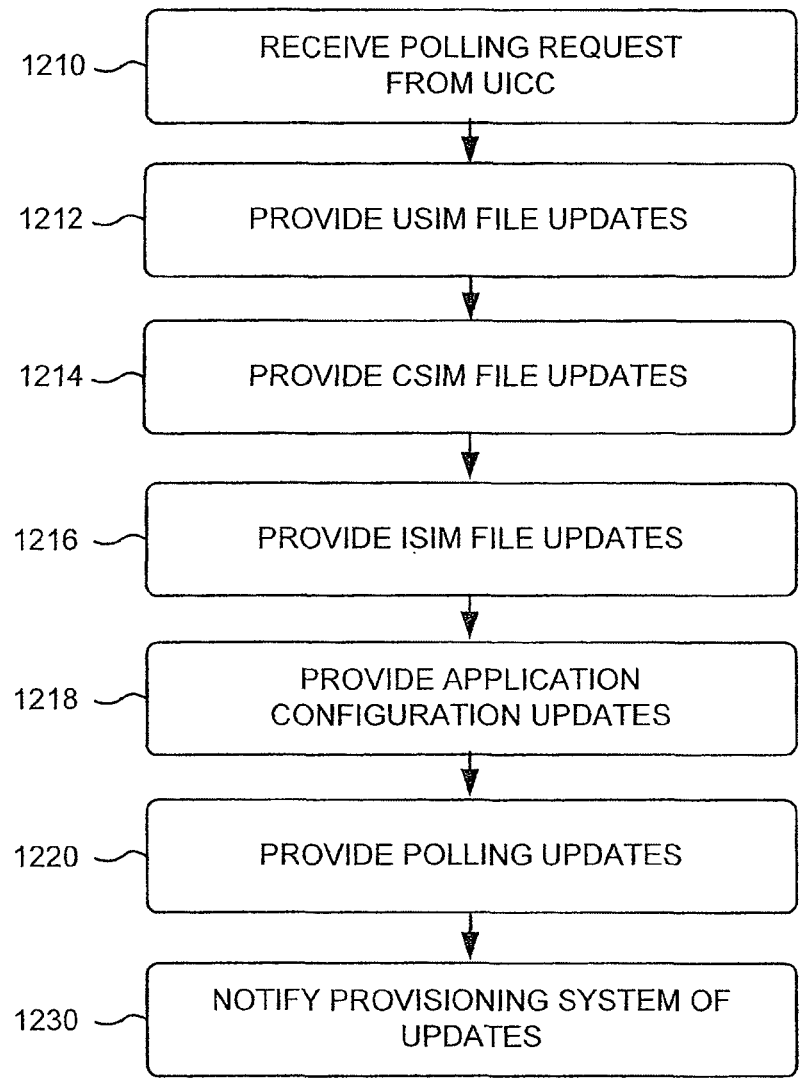
FIG. 12 is a flow diagram illustrating an example process of performing UICC updates, performed by the programming system, according to an implementation described herein.

FIG. 12 is a flow diagram illustrating an example process of performing UICC updates according to an implementation described herein. In one implementation, the process of FIG. 12 may be performed by programming system 190. In other implementations, some or all of the process of FIG. 12 may be performed by another device or a group of devices separate from or including programming system 190.

The process of FIG. 12 may include receiving a polling request (block 1210). For example, programming system 190 may receive a request from UICC 102 to check for updates for UICC 102. The polling request may include the ICCID associated with UICC 102. Programming system 190 may determine whether updates are necessary by consulting UICC database 550 and determining a last time that UICC 102 was updated. If no updates are necessary since the last time UICC 102 was updated, programming system 190 may not perform any updates. If it is determined that updates are necessary, programming system 190 may provide file updates to UICC 102.

USIM file updates may be provided (block 1212). For example, programming system 190 may provide USIM file updates to UICC 102. The USIM file updates may include, for example, updates to any fields of USIM database 572.

CSIM file updates may be provided (block 1214). For example, programming system 190 may provide CSIM file updates to UICC 102. The CSIM file updates may include, for example, updates to any fields of CSIM database 574.

ISIM file updates may be provided (block 1216). For example, programming system 190 may provide ISIM file updates to UICC 102. The ISIM file updates may include, for example, updates to any fields of ISIM database 572.

Application configuration updates may be provided (block 1218). For example, programming system 190 may provide application configuration updates to UICC 102. Application configuration updates may include, for example, updates to any fields of application configuration database 578.

Polling updates may be provided (block 1220). For example, programming system 190 may provide polling updates that indicate particular conditions that may cause UICC 102 to request updates from programming system 190. The particular conditions may include, for example, particular intervals at which updates are to be performed, or particular trigger events that may cause UICC 102 to request an update.

Provisioning system 180 may be notified of updates (block 1230). Once all file updates have been provided to UICC 102, programming system 190 may send a notification provisioning system 180 that UICC 102 has been activated. The notification may include the ICCID associated with UICC 102, the MSISDN, and a report of the update results that were performed by programming system 190.

Figure 13A:
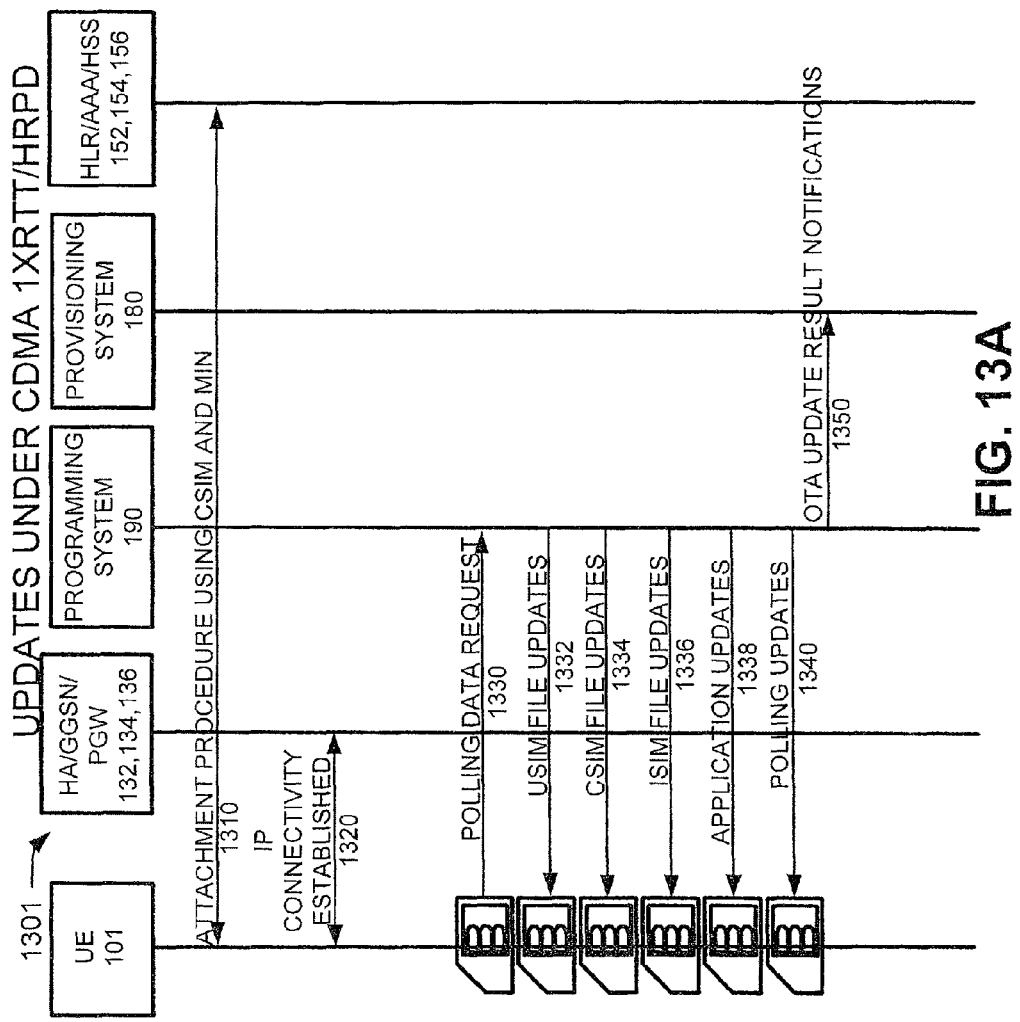
FIG. 13A is a diagram illustrating an example signal flow of performing UICC updates under CDMA coverage according to an implementation described herein.

FIG. 13A is a diagram illustrating a first example signal flow 1301 of performing UICC updates according to an implementation described herein. Signal flow 1301 illustrates the process of FIGS. 12A and 12B, under CDMA 1XRTT or HRPD coverage, in the context of system 100. Signal flow 1301 may include performing an attachment procedure between UE 101 and HLR 152, using CSIM 360 and the MIN stored in CSIM database 574 (signal 1310). Once the attachment procedure is completed, IP connectivity may be established between UE 101 and HA 132 (signal 1320).

UICC 102 may send a polling request, which may include the ICCID, to programming system 190 (signal 1330). Programming system 190 may provide UICC 102 with USIM file updates (signal 1332), CSIM file updates (signal 1334), ISIM file updates (signal 1336), application configuration updates (signal 1338), and polling updates (signal 1340). Once the updates are performed, programming system 190 may send a notification to provisioning system 180 that UICC updates were performed (signal 1350).

FIG. 13B is a diagram illustrating a second example signal flow 1302 of performing UICC updates according to an implementation described herein. Signal flow 1302 illustrates the process of FIGS. 12A and 12B, under GSM, eHRPD, or LTE coverage, in the context of system 100. Signal flow 1302 may include performing an attachment procedure between UE 101 and HSS 156, using USIM 340 and the IMSI stored in USIM database 572 (signal 1360). Once the attachment procedure is completed, IP connectivity may be established between UE 101 and GGSN 134 (for GSM) or PGW 136 (for eHRPD or LTE) (signal 1370). After GSM, eHRPD, or LTE IP connectivity is established, UICC updates may proceed similarly to that shown in FIG. 13A.

Figure 14:
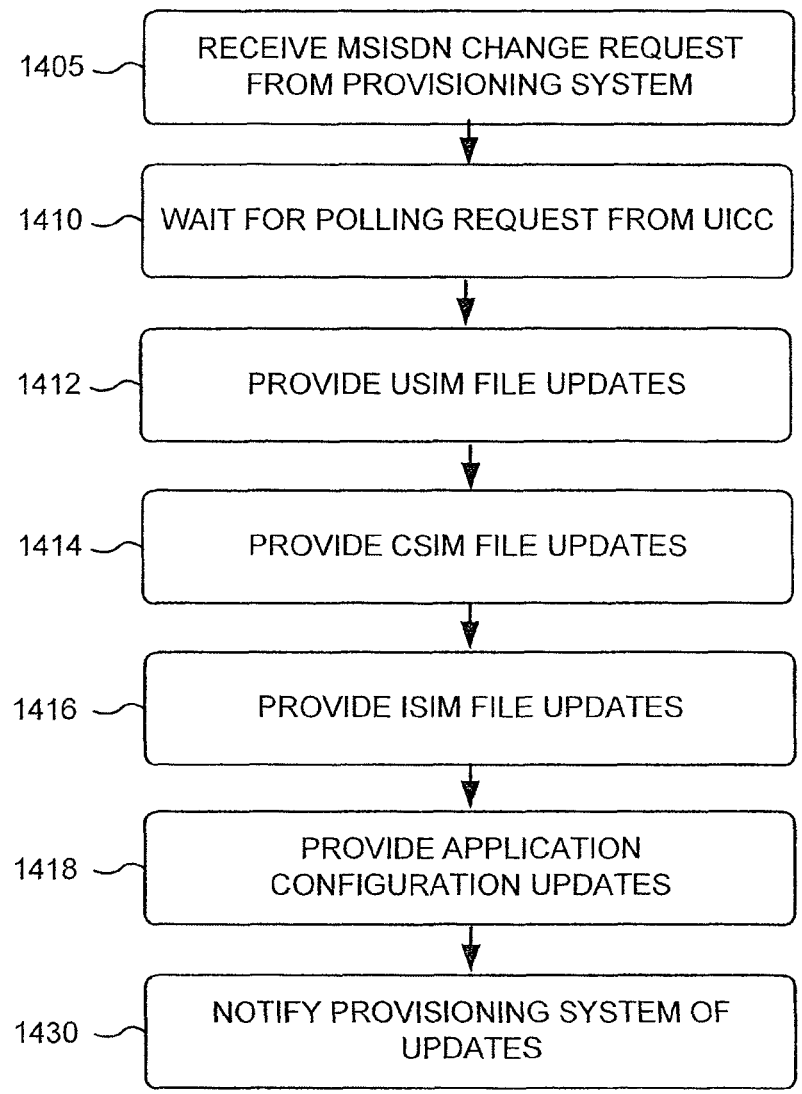
FIG. 14 is a flow diagram illustrating an example process of performing a Mobile Subscriber Integrated Services Digital Network (MSISDN) number change according to an implementation described herein.

FIG. 14 is a flow diagram illustrating an example process of performing an MSISDN change according to an implementation described herein. In one implementation, the process of FIG. 14 may be performed by programming system 190. In other implementations, some or all of the process of FIG. 14 may be performed by another device or a group of devices separate from or including programming system 190.

The process of FIG. 14 may include receiving an MSISDN change request from provisioning system 180 (block 1405). A customer may call the service provider and request a change in the customer's mobile telephone number, which may necessitate a change in the MSISDN associated with the customer's UE (and the UICC associated with the customer's UE). The service provider may instruct provisioning system 180 to change the customer's MSISDN. Programming system 190 may receive the request from provisioning system 180 to change the MSISDN associated with the customer, and may wait for a polling request from UICC (block 1410). The request to change the MSISDN may include, for example, the ICCID associated with the UICC 102 of the customer, as well as then MSISDN (which may have been selected by eTNI 173 from a pool of available MSISDN numbers).

Once a polling request has been received from UICC 102, USIM file updates may be provided (block 1412). For example, programming system 190 may provide USIM file updates to UICC 102. The USIM file updates may include, for example, updates to any fields of USIM database 572. The USIM file updates may include the new MSISDN that has been assigned to UE 101 and UICC 102.

CSIM file updates may be provided (block 1414). For example, programming system 190 may provide CSIM file updates to UICC 102. The CSIM file updates may include, for example, updates to any fields of CSIM database 574.

ISIM file updates may be provided (block 1416). For example, programming system 190 may provide ISIM file updates to UICC 102. The ISIM file updates may include, for example, updates to any fields of ISIM database 572.

Application configuration updates may be provided (block 1418). For example, programming system 190 may provide application configuration updates to UICC 102. Application configuration updates may include, for example, updates to any fields of application configuration database 578.

Provisioning system 180 may be notified of the updates (block 1430). Once all file updates have been provided to UICC 102, programming system 190 may send a notification provisioning system 180 that UICC 102 has been updated. The notification may include the ICCID associated with UICC 102, the MSISDN, and a report of the updates that were performed by programming system 190.

Figure 15A:
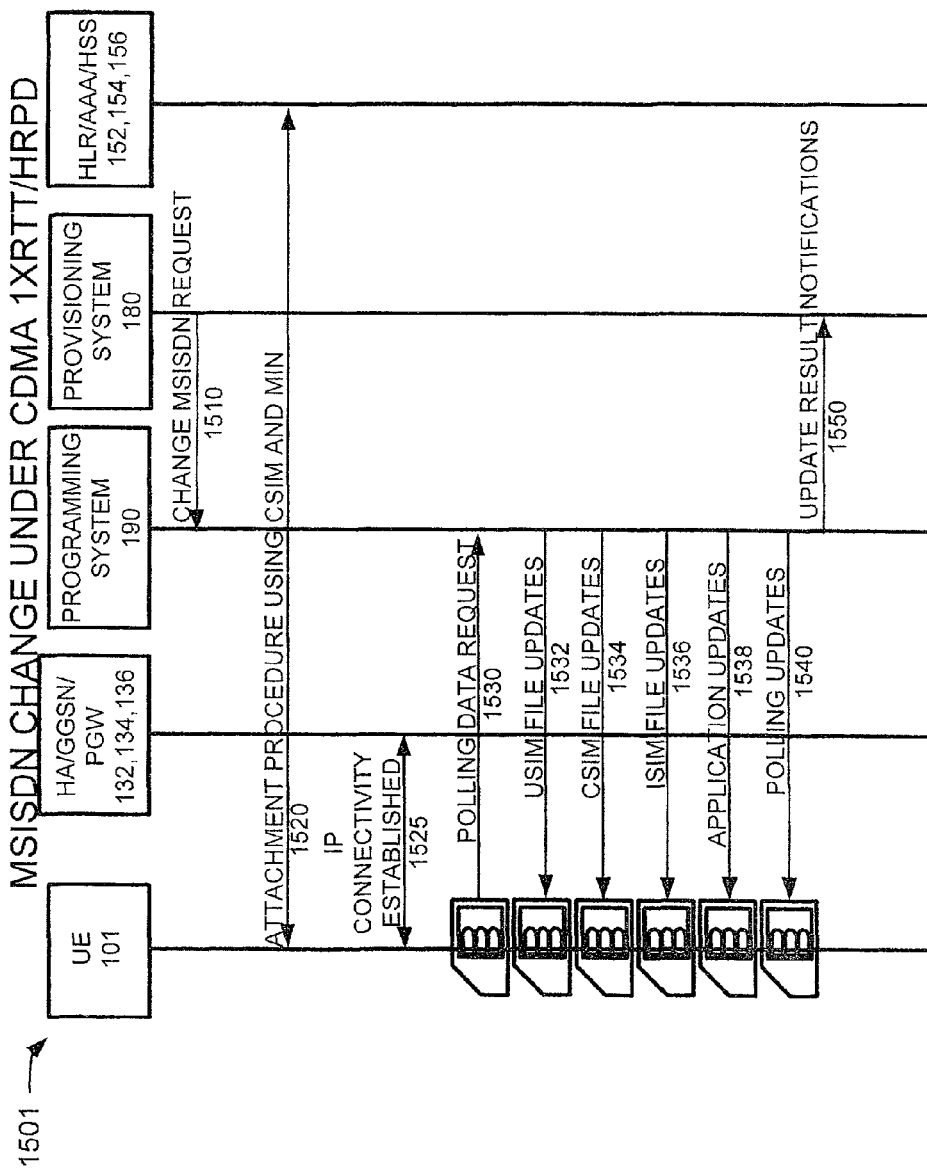
FIG. 15A is a diagram illustrating an example signal flow of performing an MSISDN number change under CDMA coverage according to an implementation described herein.

FIG. 15A is a diagram illustrating a first example signal flow 1501 of performing an MSISDN change according to an implementation described herein. Signal flow 1501 illustrates the process of FIG. 14, under CDMA coverage, in the context of system 100. Signal flow 1501 may include provisioning system 180 sending a change MSISDN request to programming system 190 (signal 1510). Programming system 190 may wait for a polling request from the UICC 102.

UE 101 may perform an attachment procedure with HLR 152, using CSIM 360 and the MIN stored in CSIM database 574 (signal 1520). Once the attachment procedure is completed, IP connectivity may be established between UE 101 and HA 132 (signal 1525).

UICC 102 may send a polling request, which may include the ICCID, to programming system 190 (signal 1530). Programming system 190 may provide UICC 102 with USIM file updates (signal 1532), CSIM file updates (signal 1534), ISIM file updates (signal 1536), application configuration updates (signal 1538), and polling updates (signal 1540). Once the updates are performed, programming system 190 may send a notification to provisioning system 180 that UICC updates were performed (signal 1550).

Figure 15B:
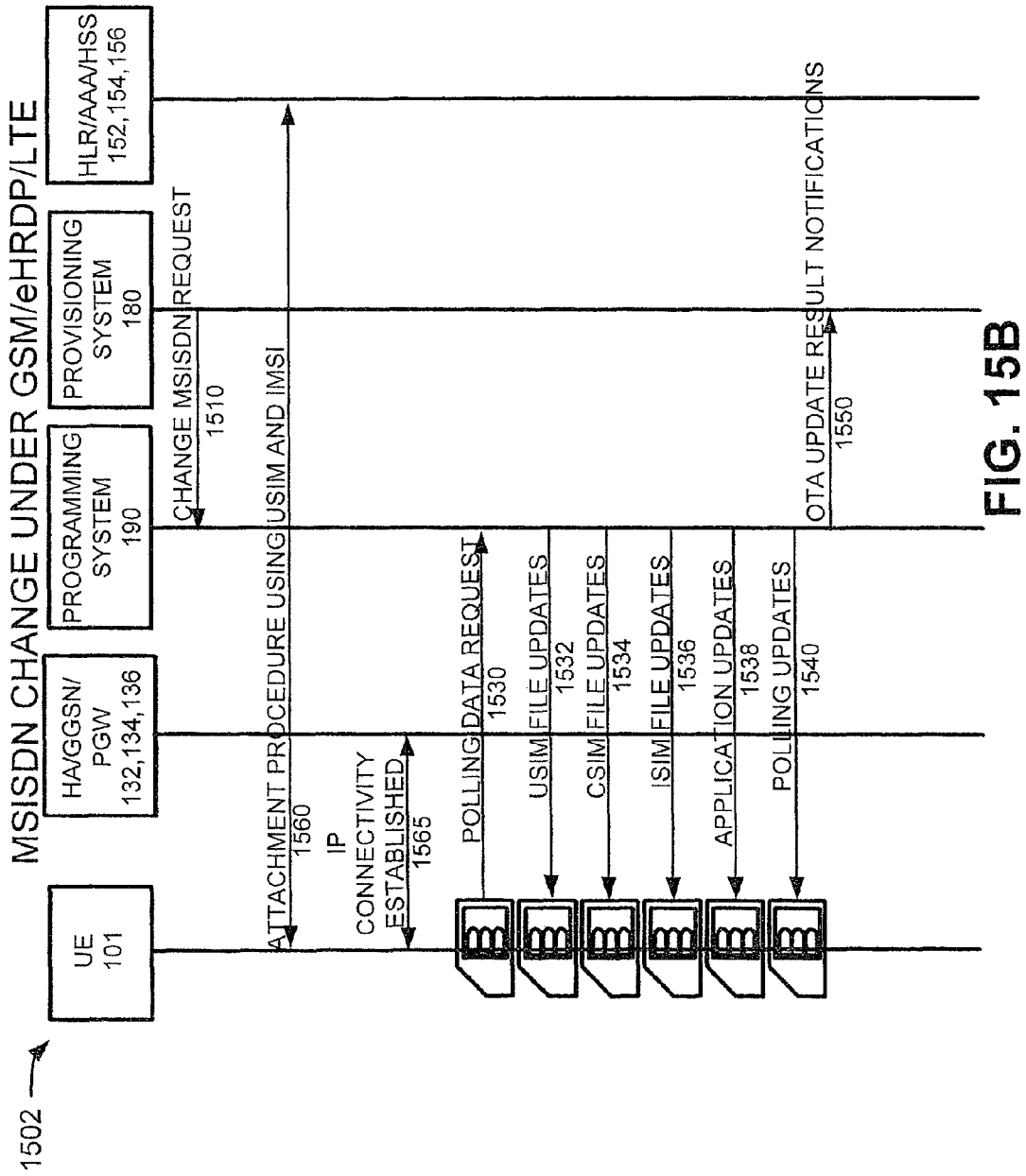
FIG. 15B is a diagram illustrating an example signal flow of performing an MSISDN number change under LTE or eHRPD coverage according to an implementation described herein.

FIG. 15B is a diagram illustrating a second example signal flow 1502 of performing an MSISDN change according to an implementation described herein. Signal flow 1502 illustrates the process of FIG. 14, under GSM, eHRPD, or LTE coverage, in the context of system 100. Signal flow 1502 may include provisioning system 180 sending a change MSISDN request to programming system 190 (signal 1510). Programming system 190 may wait for a polling request from the UICC 102.

UE 101 may performing an attachment procedure between UE 101 and HSS 156, using USIM 340 and the IMSI stored in USIM database 572 (signal 1560). Once the attachment procedure is completed, IP connectivity may be established between UE 101 and GGSN 134 (for GSM) or PGW 136 (for eHRPD or LTE) (signal 1565). After GSM, eHRPD, or LTE IP connectivity is established, UICC updates may proceed similarly to that shown in FIG. 15A.

Figure 16A:
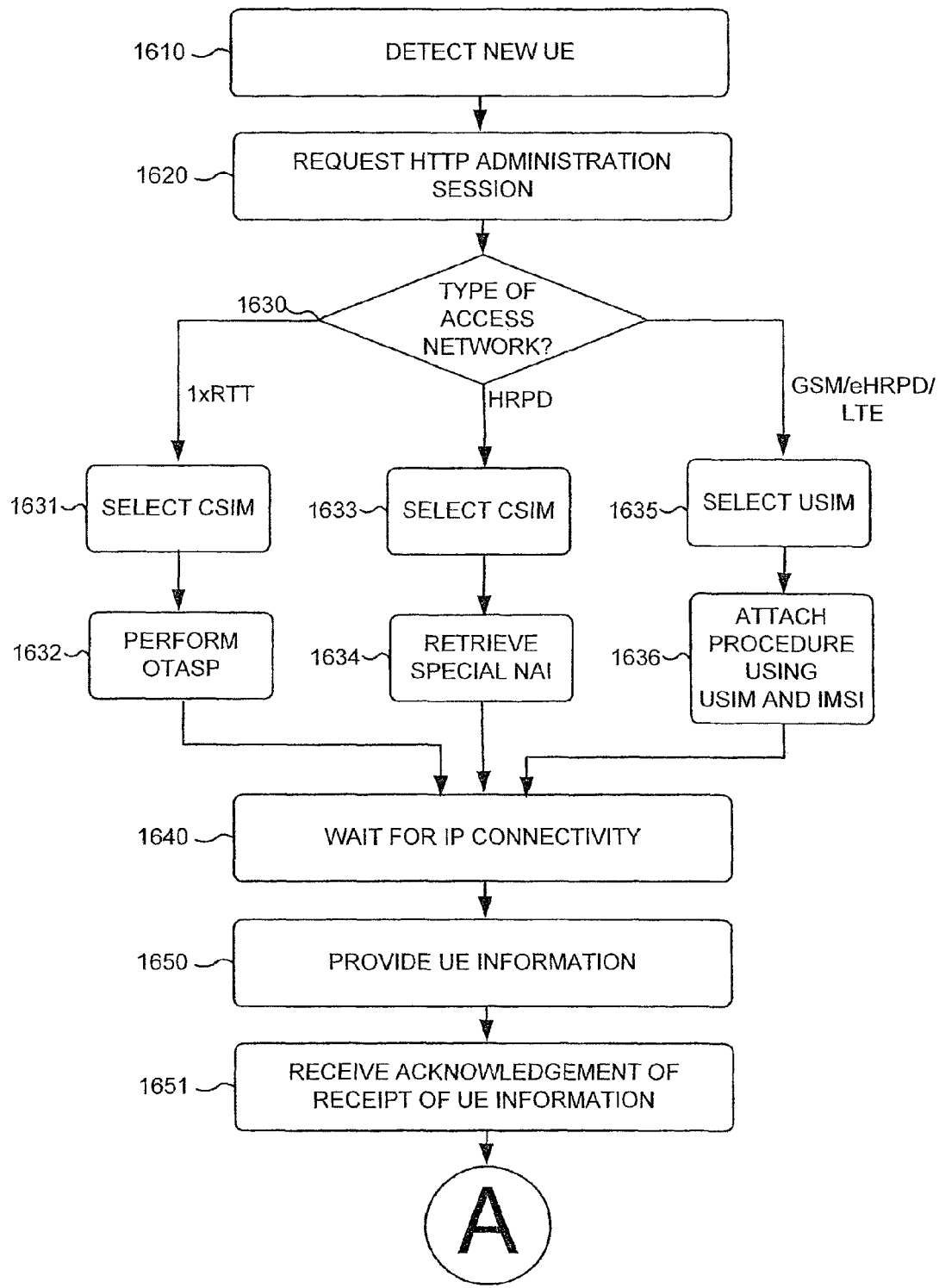
FIGS. 16A and 16B are flow diagrams illustrating an example process in response to moving the UICC to a new UE, performed by the UICC, according to an implementation described herein.
Figure 16B:
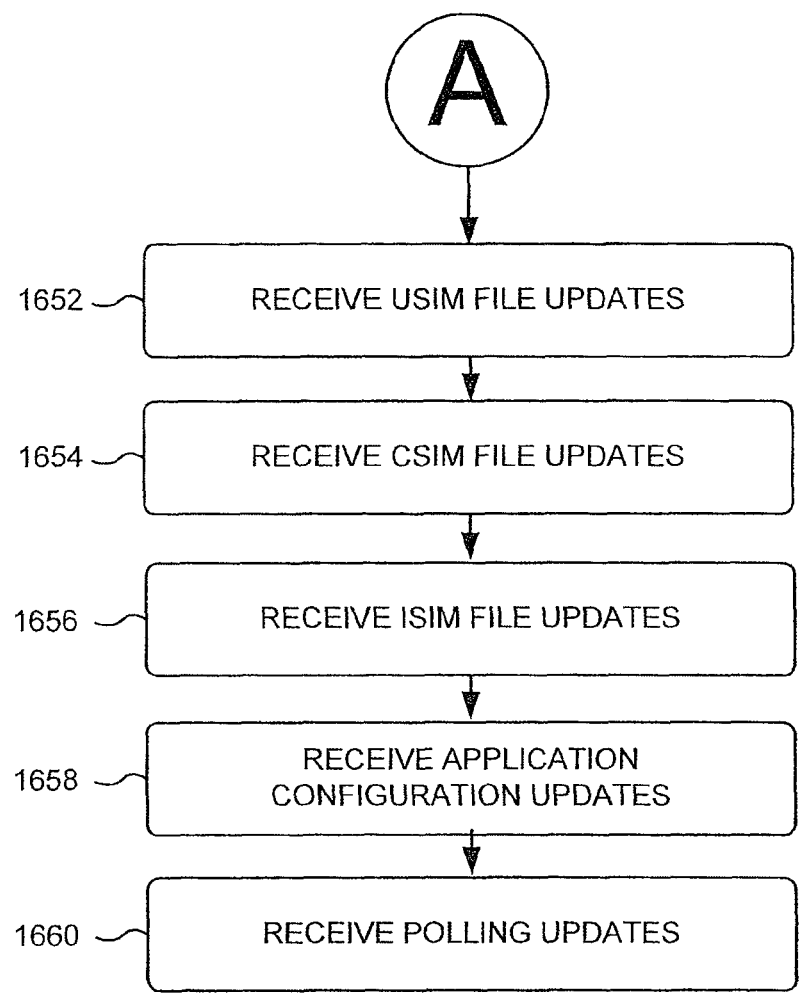

FIGS. 16A and 16B are flow diagrams illustrating an example process performed in response to moving the UICC to a new UE according to an implementation described herein. In one implementation, the process of FIGS. 16A and 16B may be performed by UICC 102. In other implementations, some or all of the process of FIGS. 16A and 16B may be performed by another device or a group of devices separate from or including UICC 102.

The process of FIGS. 16A and 16B may include detecting a new UE (block 1610). In one implementation, when UICC 102 is placed into a new UE and the new UE is powered up, device information component 560 may detect the new UE. For example, device information component 560 may detect a new IMEI associated with the new UE. In another implementation, device information component 560 may detect a new UE if the UE is updated with a new software version. For example, device information component 560 may detect a new IMEI_SV associated with the new software version installed on UE 101. Device information component 560 may store information about the new UE in UE database 565.

In response to detecting the new UE, a new HTTP administration session may be requested (block 1620). For example, UICC 102 may request UE 101 to set up an HTTP administration session with core network 140 so that UICC 102 may be activated.

A type of access network may be determined (block 1630). For example, UICC 102 may query UE 101 to determine what kind of coverage is available. UE 101 may power up an RF transceiver and scan for base stations. Once UE 101 has detected a base station, UE 101 may identify a type of base station and provide information about the base station to UICC 102.

If an 1XRTT base station is detected (block 1630—1XRTT), CSIM 360 may be selected for performing updates (block 1631) and over the air service provisioning (OTASP) may be performed (block 1632). For example, card update component 570 may select CSIM 360 to be used for performing updates and CSIM 360 may retrieve an OTAF number stored in 1XRTT profile field 635 of CSIM database 572. The OTAF number may be provided to UE 101 and may be used to contact OTAF 162. OTAF 162 may perform an OTASP transaction, which may include providing UICC 102 with a mobile IMSI (IMSI_M). The provided IMSI_M may be used by UICC 102 to perform HLR authentication by contacting HLR 152. Once HLR 152 is contacted, waiting for IP connectivity may occur (block 1640).

If an HRPD base station is detected (block 1630—HRPD), CSIM 360 may be selected for performing updates (block 1633) and a special NAI may be retrieved (block 1634). For example, card update component 570 may select CSIM 360 to be used for performing updates and CSIM 360 may retrieve a special NAI stored in HRPD profile field 636 of CSIM database 572. The special NAI may be provided to UE 101 and waiting for IP connectivity may occur (block 1640).

If a GSM, eHRPD, or an LTE base station is detected (block 1130—GSM/eHRPD/LTE), USIM 340 may be selected for performing updates (block 1635) and an attach procedure using USIM 340 and IMSI may be performed (block 1636). For example, UICC 102 may provide the IMSI to UE 101 and waiting for IP connectivity may occur (block 1640).

Once IP connectivity is established, UE information may be provided (block 1650). For example, device information component 560 may provide UE information about the new UE from UE database 565 to programming system 190. The information may include, for example, the ICCID associated with UICC 102, the IMEI or IMEI_SV associated with the new UE, the IMSI associated with UICC 102, and a terminal profile associated with the new UE.

An acknowledgement may be received of the receipt of the UE information (block 1651). For example, UICC 102 may receive an acknowledgement from programming system 190 that the UE information was successfully received.

Continuing at FIG. 16B, USIM file updates may be received (block 1652). For example, USIM 340 may receive USIM file updates and store the updates in USIM database 572. The USIM file updates may include, for example, updates to any fields of USIM database 572.

CSIM file updates may be received (block 1654). For example, CSIM 360 may receive CSIM file updates and store the updates in CSIM database 574. The CSIM file updates may include, for example, updates to any fields of CSIM database 574.

ISIM file updates may be received (block 1656). For example, ISIM 350 may receive ISIM file updates and store the updates in ISIM database 576. The ISIM file updates may include, for example, updates to any fields of ISIM database 576.

Application configuration updates may be received (block 1658). For example, UICC 102 may receive application configuration updates and store the updates in application configuration database 578. Application configuration updates may include, for example, updates to any fields of application configuration database 578.

Polling updates may be received (block 1660). For example, UICC 101 may receive polling updates that indicate particular conditions that may cause UICC 102 to request updates from programming system 190. The particular conditions may include, for example, particular intervals at which updates are to be performed, or particular trigger events that may cause UICC 102 to request an update. The received polling updates may be stored in polling database 585.

Figure 17:
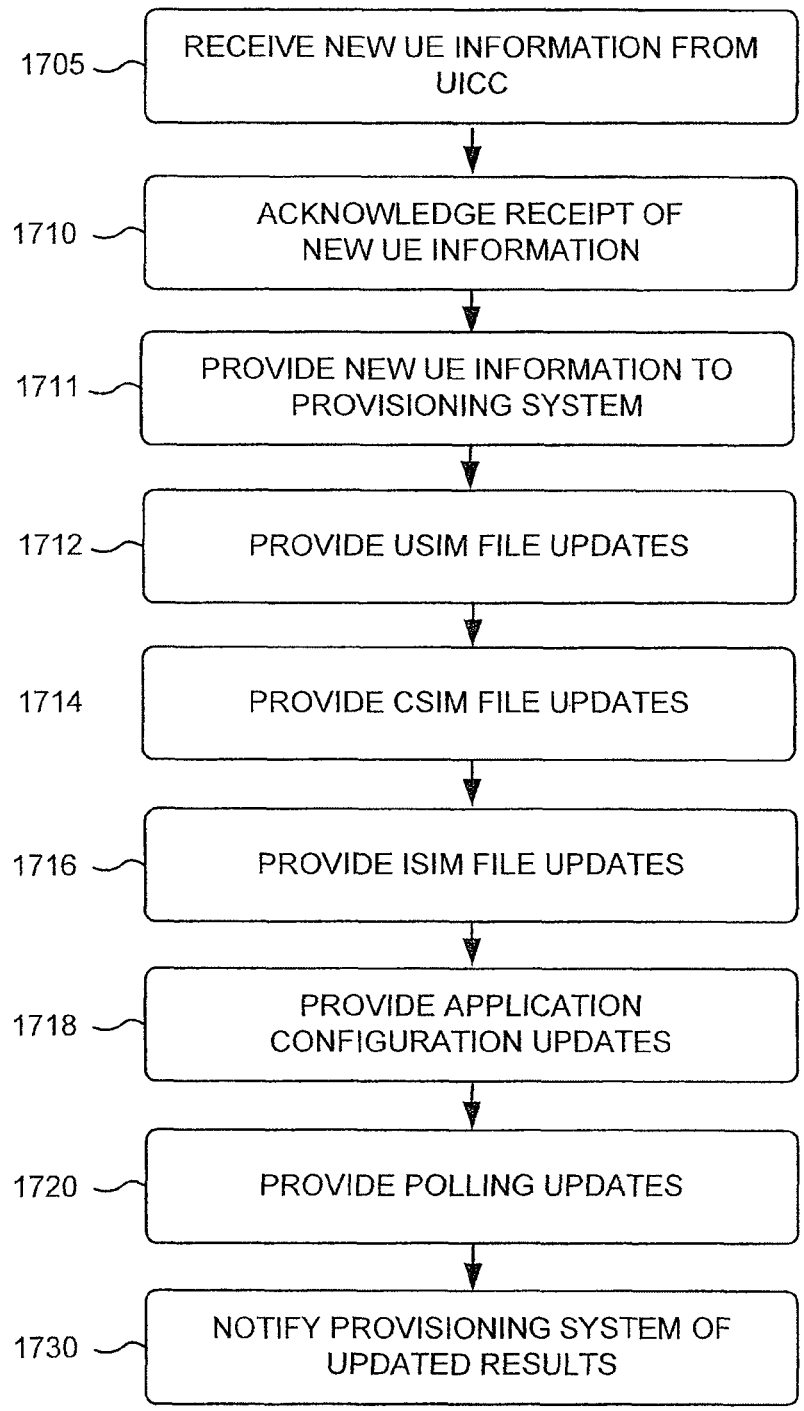
FIG. 17 is flow diagram illustrating an example process in response to moving the UICC to a new UE, performed by the programming system, according to an implementation described herein.

FIG. 17 is flow diagram illustrating an example process in response to moving the UICC to a new UE according to an implementation described herein. In one implementation, the process of FIG. 17 may be performed by programming system 190. In other implementations, some or all of the process of FIG. 17 may be performed by another device or a group of devices separate from or including programming system 190.

The process of FIG. 17 may include receiving new UE information from the UICC (block 1705). For example, programming system 190 may receive, from UICC 102, information about a new UE after UICC 102 has been installed in a new UE, or after UE 101 has been updated to a new software version. The information may include, for example, information from UE database 565, such as the ICCID associated with UICC 102, the IMEI and/or IMEI_SV associated with UE 101, the IMSI associated with UICC 102, and a terminal profile associated with UE 101.

Receipt of the new UE information may be acknowledged (block 1710). For example, programming system 190 may send an acknowledgement to UICC 102, indicating that the new UE information has been received.

The UE information may be provided to provisioning system 180 (block 1711). For example, programming system 190 may send a device change notification to provisioning system 180, indicating a new UE 101 is associated with UICC 102. The device change notification may include the ICCID associated with UICC 102, the IMEI and/or IMEI_SV associated with UE 101, an old IMEI and/or IMEI_SV previously associated with UICC 102, the IMSI, the MIN, and the terminal profile. Provisioning system 180 may forward the device change notification to DMD 171.

USIM file updates may be provided (block 1712). For example, programming system 190 may provide USIM file updates to UICC 102. The USIM file updates may include, for example, updates to any fields of USIM database 572.

CSIM file updates may be provided (block 1714). For example, programming system 190 may provide CSIM file updates to UICC 102. The CSIM file updates may include, for example, updates to any fields of CSIM database 574.

ISIM file updates may be provided (block 1716). For example, programming system 190 may provide ISIM file updates to UICC 102. The ISIM file updates may include, for example, updates to any fields of ISIM database 572.

Application configuration updates may be provided (block 1718). For example, programming system 190 may provide application configuration updates to UICC 102. Application configuration updates may include, for example, updates to any fields of application configuration database 578.

Polling updates may be provided (block 1720). For example, programming system 190 may provide polling updates that indicate particular conditions that may cause UICC 102 to request updates from programming system 190.

The particular conditions may include, for example, particular intervals at which updates are to be performed, or particular trigger events that may cause UICC 102 to request an update.

Provisioning system 180 may be notified of the updated results (block 1730). Once all file updates have been provided to UICC 102, programming system 190 may send a notification provisioning system 180 that UICC 102 has been updated. The notification may include the ICCID associated with UICC 102, the MSISDN, and a report of the updates that were performed by programming system 190.

FIG. 18A is a diagram illustrating a first example signal flow 1801 in response to moving the UICC to a new UE according to an implementation described herein. Signal flow 1801 illustrates the process of FIGS. 16A, 16B, and 17, under CDMA coverage, in the context of system 100. Signal flow 1801 may include performing an attachment procedure between UE 101 and HLR 152, using CSIM 360 and the MIN stored in CSIM database 574 (signal 1810). The attachment procedure may be performed in response to UICC 102 detecting a new UE and instructing the new UE to perform the attachment procedure. Once the attachment procedure is completed, IP connectivity may be established between UE 101 and HA 132 (signal 1815).

Once IP connectivity is established, UICC 102 may provide new UE information to programming system 190 (signal 1820). The new UE information may include, for example, the ICCID associated with UICC 102, the IMEI or IMEI_SV associated with the new UE, the IMSI associated with UICC 102, and a terminal profile associated with the new UE. Programming system 190 may send an acknowledgement to UICC 102, indicating that the new UE information was received (signal 1822). Programming system 190 may send a device change notification to provisioning system 180 (signal 1824), and provisioning system 180 may forward the device change notification to DMD 171, indicating a new UE 101 is associated with UICC 102 (signal 1825). The device change notification may include, for example, the ICCID associated with UICC 102, the IMEI or IMEI_SV associated with the new UE, an old IMEI or IMEI_SV previously associated with UICC 102, the IMSI, the MIN, and the terminal profile associated with the new UE.

After sending the device change notification to DMD 171, programming system 190 may provide UICC 102 with USIM file updates (signal 1832), CSIM file updates (signal 1834), ISIM file updates (signal 1836), application configuration updates (signal 1938), and polling updates (signal 1840). Once the updates are performed, programming system 190 may send a notification to provisioning system 180 that UICC updates were performed (signal 1850).

Figure 18B:
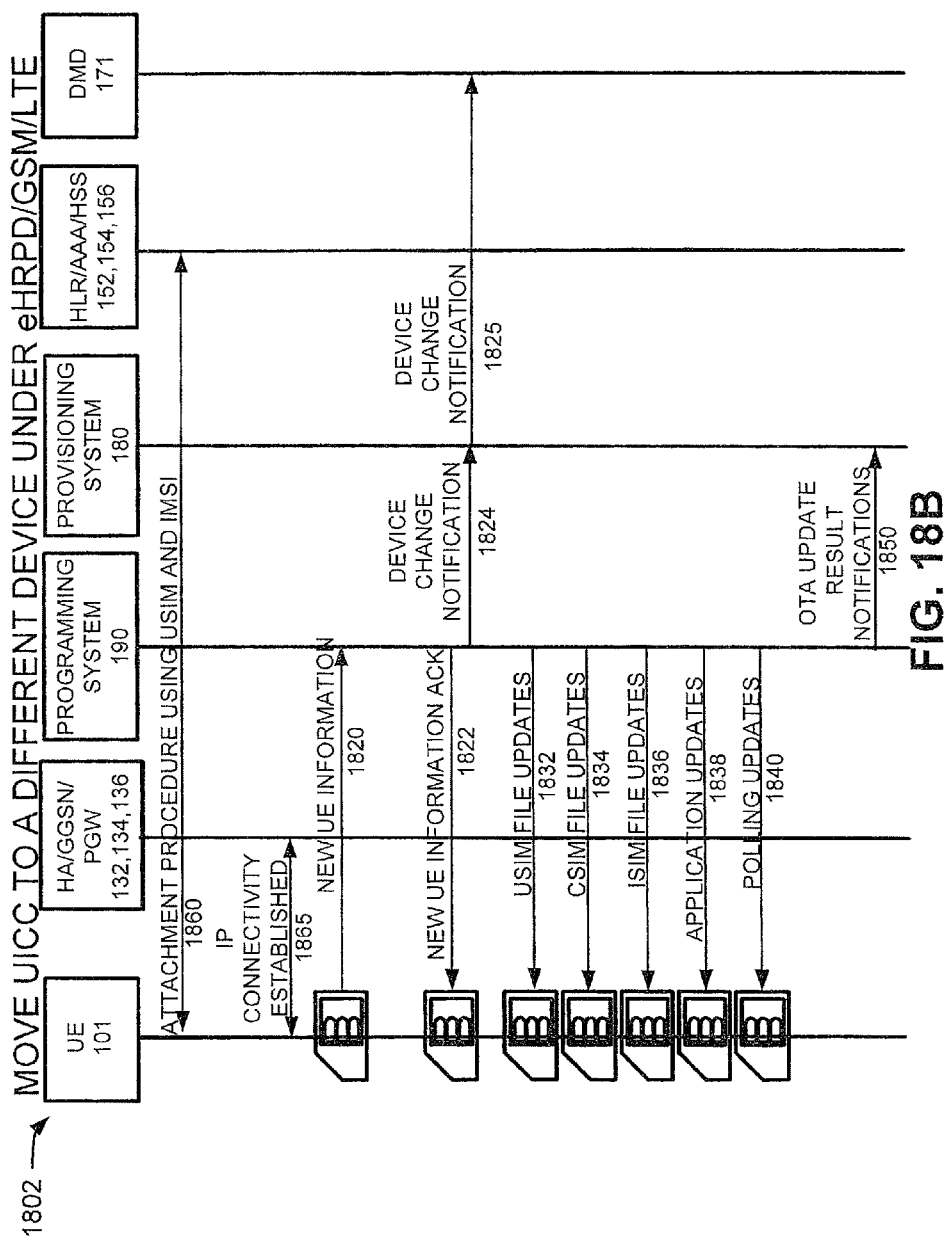
FIG. 18B is a diagram illustrating an example signal flow, in response to moving the UICC to a new UE, under LTE or eHRPD coverage according to an implementation described herein.

FIG. 18B is a diagram illustrating a second example signal flow 1802 in response to moving the UICC to a new UE according to an implementation described herein. Signal flow 1802 illustrates the process of FIGS. 16A, 16B, and 17, under GSM, eHRPD, or LTE coverage, in the context of system 100. Signal flow 1802 may include performing an attachment procedure between UE 101 and GGSN 134 (for GSM) or PGW 136 (for eHRPD or LTE), using USIM 340 and the IMSI stored in USIM database 572 (signal 1860). The attachment procedure may be performed in response to UICC 102 detecting a new UE and instructing the new UE to perform the attachment procedure. Once the attachment procedure is completed, IP connectivity may be established between UE 101 and GGSN 134 or HSS 136 (signal 1865). After GSM, eHRPD, or LTE IP connectivity is established, UICC updates may proceed similarly to that shown in FIG. 18A.

Figure 19:
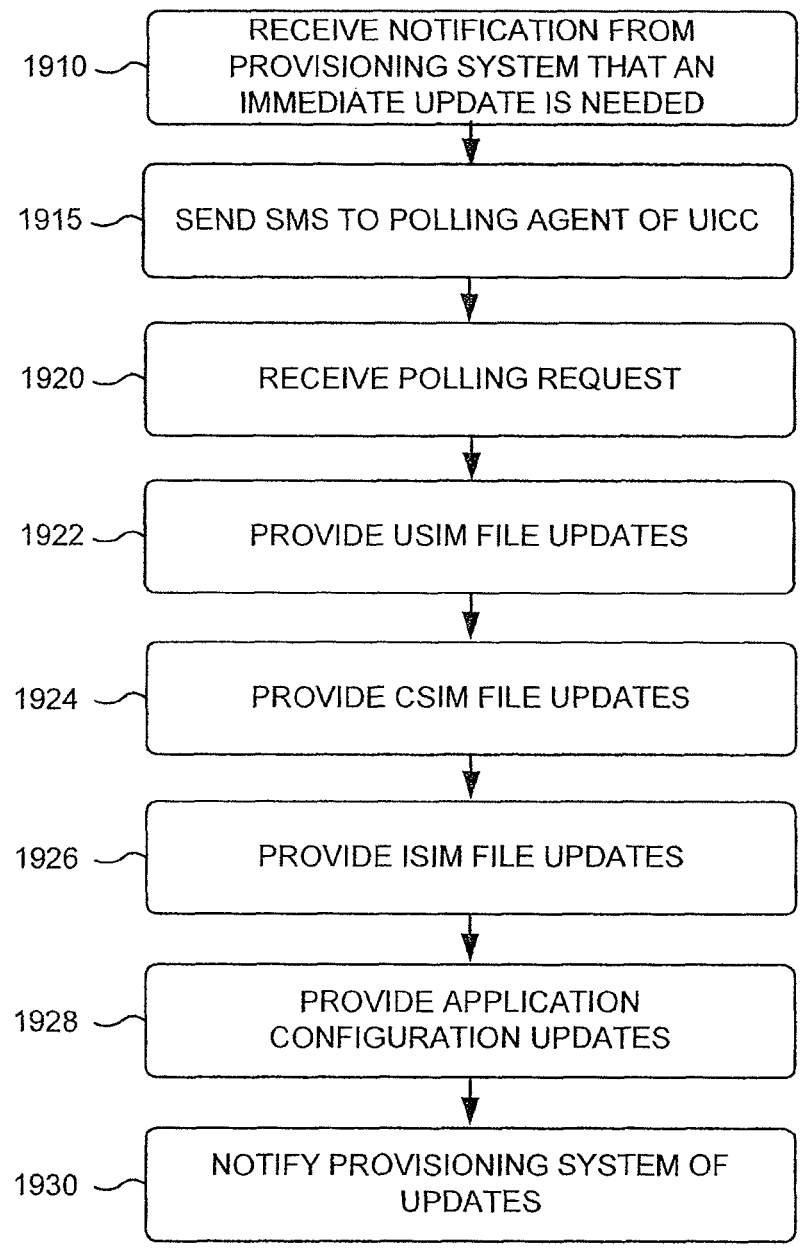
FIG. 19 is a flow diagram illustrating an example process of triggering updates via Short Message Service (SMS), performed by the programming system, according to an implementation described herein.

FIG. 19 is a flow diagram illustrating an example process of triggering updates via SMS according to an implementation described herein. In one implementation, the process of FIG. 19 may be performed by programming system 190. In other implementations, some or all of the process of FIG. 19 may be performed by another device or a group of devices separate from or including programming system 190.

The process of FIG. 19 may include receiving a notification from provisioning system 180 that an immediate update is needed (block 1910). For example, a customer may change a service plan, which may require changes to information stored in UICC 102. As another example, changes in an access procedure for a particular access network may require changes to information stored in UICC 102.

An SMS may be sent to a polling agent of UICC 102 (block 1915). For example, card update component 535 of programming system 190 may send an SMS, via SMS center 195, to polling agent 580 of UICC 102, instructing polling agent 580 to request an immediate update (block 1915).

A polling request may be received (block 1920). For example, programming system 190 may receive a polling request for updates from UICC 102 to program UICC 102. The polling request may include the ICCID associated with UICC 102.

USIM file updates may be provided (block 1922). For example, programming system 190 may provide USIM file updates to UICC 102. The USIM file updates may include, for example, updates to any fields of USIM database 572.

CSIM file updates may be provided (block 1924). For example, programming system 190 may provide CSIM file updates to UICC 102. The CSIM file updates may include, for example, updates to any fields of CSIM database 574.

ISIM file updates may be provided (block 1926). For example, programming system 190 may provide ISIM file updates to UICC 102. The ISIM file updates may include, for example, updates to any fields of ISIM database 572.

Application configuration updates may be provided (block 1928). For example, programming system 190 may provide application configuration updates to UICC 102. Application configuration updates may include, for example, updates to any fields of application configuration database 578.

Provisioning system 180 may be notified of updates (block 1930). Once all file updates have been provided to UICC 102, programming system 190 may send a notification provisioning system 180 that UICC 102 has been activated. The notification may include the ICCID associated with UICC 102, the MSISDN, and a report of the updates that were performed by programming system 190.

Figure 20A:
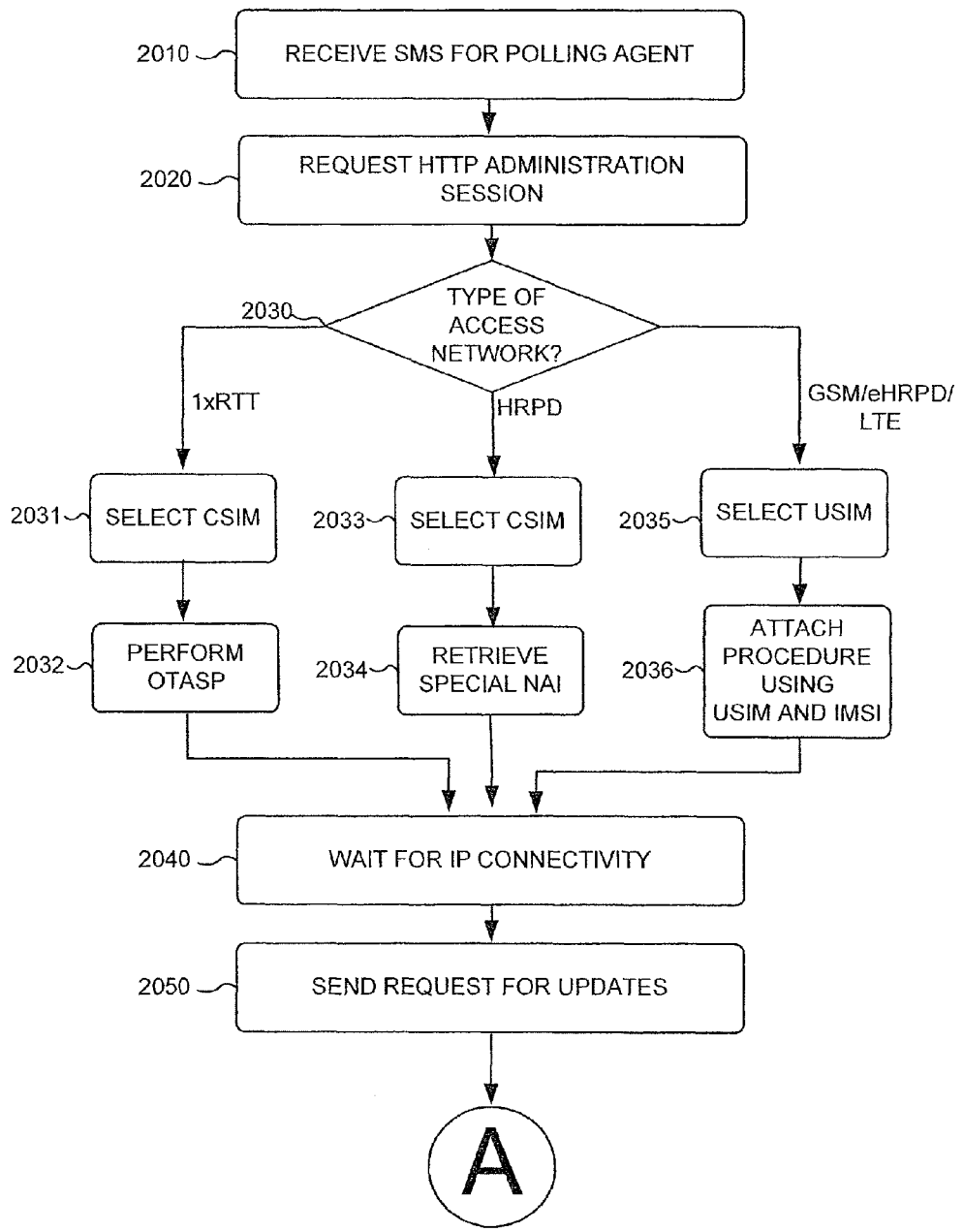
FIGS. 20A and 20B are flow diagrams illustrating an example process of triggering updates via SMS, performed by the UICC, according to an implementation described herein.
Figure 20B:
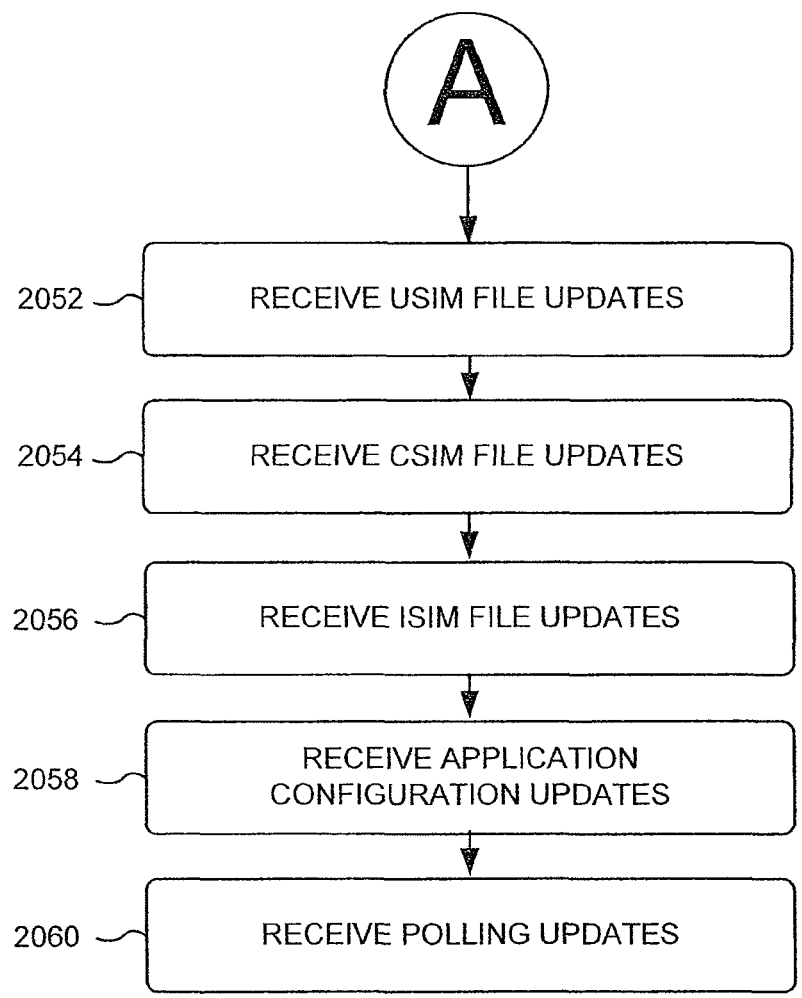

FIGS. 20A and 20B are flow diagrams illustrating an example process of triggering updates via SMS according to an implementation described herein. In one implementation, the process of FIGS. 20A and 20B may be performed by UICC 102. In other implementations, some or all of the process of FIGS. 20A and 20B may be performed by another device or a group of devices separate from or including UICC 102.

The process of FIGS. 20A and 20B may include receiving an SMS for polling agent 580 (block 2010). For example, UICC 102 may receive an SMS from programming system 190 for polling agent 580, instructing polling agent 580 to immediately send a polling request for updates to programming system 190.

A new HTTP administration session may be requested (block 2020). For example, UICC 102 may request, in response to receiving the SMS, UE 101 to set up an HTTP administration session with core network 140 to that UICC 102 may be activated.

A type of access network may be determined (block 2030). For example, UICC 102 may query UE 101 to determine what kind of coverage is available. UE 101 may power up an RF transceiver and scan for base stations. Once UE 101 has detected a base station, UE 101 may identify a type of base station and provide information about the base station to UICC 102.

If an 1XRTT base station is detected (block 2030—1XRTT), CSIM 360 may be selected for performing updates (block 2031) and over the air service provisioning (OTASP) may be performed (block 2032). For example, card update component 570 may select CSIM 360 to be used for performing updates and CSIM 360 may retrieve an OTAF number stored in 1XRTT profile field 635 of CSIM database 572. The OTAF number may be provided to UE 101 and may be used to contact OTAF 162. OTAF 162 may perform an OTASP transaction, which may include providing UICC 102 with a mobile IMSI (IMSI_M). The provided IMSI_M may be used by UICC 102 to perform HLR authentication by contacting HLR 152. Once HLR 152 is contacted, waiting for IP connectivity may occur (block 2040).

If an HRPD base station is detected (block 2030—HRPD), CSIM 360 may be selected for performing updates (block 2033) and a special NAI may be retrieved (block 2034). For example, card update component 570 may select CSIM 360 to be used for performing updates and CSIM 360 may retrieve a special NAI stored in HRPD profile field 636 of CSIM database 572. The special NAI may be provided to UE 101 and waiting for IP connectivity may occur (block 2040).

If a GSM, eHRPD, or an LTE base station is detected (block 2030—GSM/eHRPD/LTE), USIM 340 may be selected for performing updates (block 2035) and an attach procedure using USIM 340 and IMSI may be performed (block 2036). For example, UICC 102 may provide the IMSI to UE 101 and waiting for IP connectivity may occur (block 2040).

Once IP connectivity is established, a polling request may be sent (block 2050). For example, UICC 102 may send a polling request to programming system 190 to update UICC 102.

Continuing at FIG. 20B, USIM file updates may be received (block 2052). For example, USIM 340 may receive USIM file updates and store the updates in USIM database 572. The USIM file updates may include, for example, updates to any fields of USIM database 572.

CSIM file updates may be received (block 2054). For example, CSIM 360 may receive CSIM file updates and store the updates in CSIM database 574. The CSIM file updates may include, for example, updates to any fields of CSIM database 574.

ISIM file updates may be received (block 2056). For example, ISIM 350 may receive ISIM file updates and store the updates in ISIM database 576. The ISIM file updates may include, for example, updates to any fields of ISIM database 576.

Application configuration updates may be received (block 2058). For example, UICC 102 may receive application configuration updates and store the updates in application configuration database 578. Application configuration updates may include, for example, updates to any fields of application configuration database 578.

Polling updates may be received (block 2060). For example, UICC 101 may receive polling updates that indicate particular conditions that may cause UICC 102 to request updates from programming system 190. The particular conditions may include, for example, particular intervals at which updates are to be performed, or particular trigger events that may cause UICC 102 to request an update. The received polling updates may be stored in polling database 585.

Figure 21:
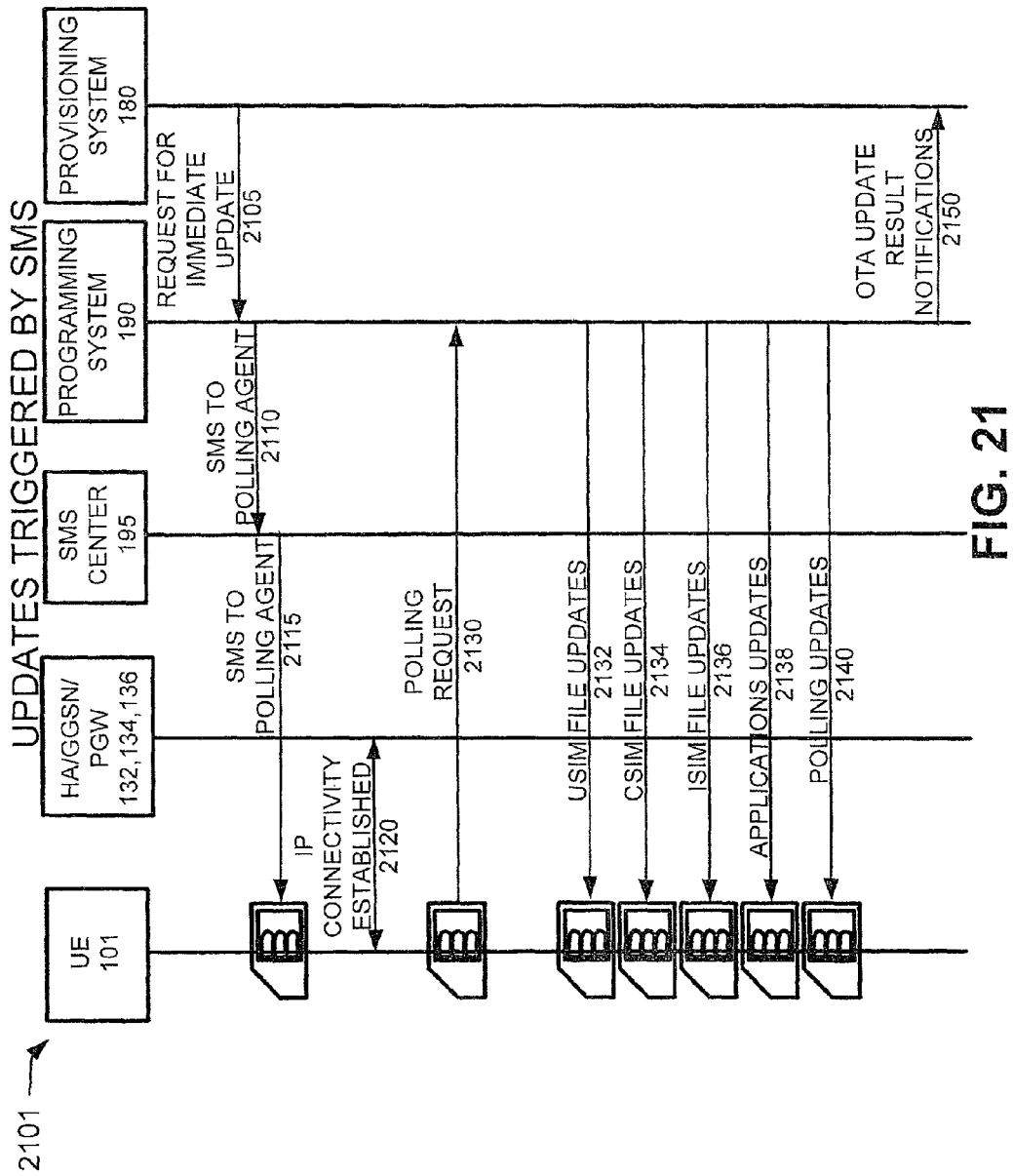
FIG. 21 is a diagram illustrating an example signal flow of triggering updates via SMS according to an implementation described herein.

FIG. 21 is a diagram illustrating an example signal flow 2101 of triggering updates via SMS according to an implementation described herein. Signal flow 2101 illustrates the process of FIGS. 19, 20A, and 20B in the context of system 100. Signal flow 2101 may include provisioning system 180 sending a request for an immediate update to programming system 190 (signal 2105). Programming system 190 may, in response to receiving the request, send an SMS to polling agent 580 via SMS center 195 (signals 2110 and 2115).

IP connectivity may be established between UE 101 and HA 132, GGSN 134, or PGW 136 (signal 2120). For example, under CDMA 1XRTT or HRPD coverage, UE 101 may establish IP connectivity with HA 132; under GSM coverage, UE 101 may establish IP connectivity with GGSN 134; and under eHRPD or LTE coverage, UE 101 may establish IP connectivity with PGW 136.

Once IP connectivity is established, UICC 102 may send a polling request, which may include the ICCID, to programming system 190 (signal 2130). Programming system 190 may provide UICC 102 with USIM file updates (signal 2132), CSIM file updates (signal 2134), ISIM file updates (signal 2136), application configuration updates (signal 2138), and polling updates (signal 2140). Once the updates are performed, programming system 190 may send a notification to provisioning system 180 that UICC updates were performed (signal 2150).

Figure 22:
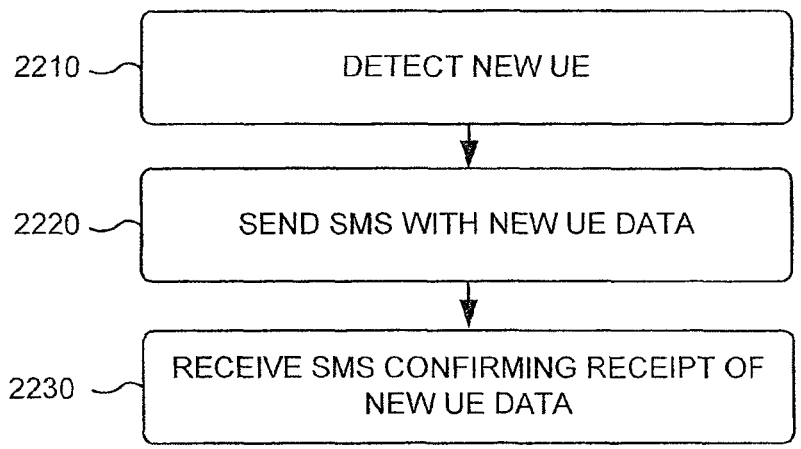
FIG. 22 is a flow diagram illustrating an example process of sending new UE information via SMS, performed by the UICC, according to an implementation described herein.

FIG. 22 is a flow diagram illustrating an example process of sending new UE information via SMS according to an implementation described herein. In one implementation, the process of FIG. 22 may be performed by UICC 102. In other implementations, some or all of the process of FIG. 22 may be performed by another device or a group of devices separate from or including UICC 102.

The process of FIG. 22 may include detecting a new UE (block 2210). In one implementation, when UICC 102 is placed into a new UE and the new UE is powered up, device information component 560 may detect the new UE. For example, device information component 560 may detect a new IMEI associated with the new UE. In another implementation, device information component 560 may detect a new UE if the UE is updated with a new software version. For example, device information component 560 may detect a new IMEI_SV associated with the new software version installed on UE 101. Device information component 560 may store information about the new UE in UE database 565.

In response to detecting the new UE, an SMS may be sent with the new UE data (block 2220). For example, device information component 560 may send the new UE information in an SMS to programming system 190 via SMS center 195. The SMS may include, for example, the ICCID associated with UICC 102, the MSISDN, the IMSI, and the IMEI of the new UE. An SMS may be received confirming receipt of the new UE data (block 2230). For example, device information component 560 may receive an SMS, from programming system 190 and via SMS center 195, with a confirmation indicating that the new UE information has been received.

Figure 23:
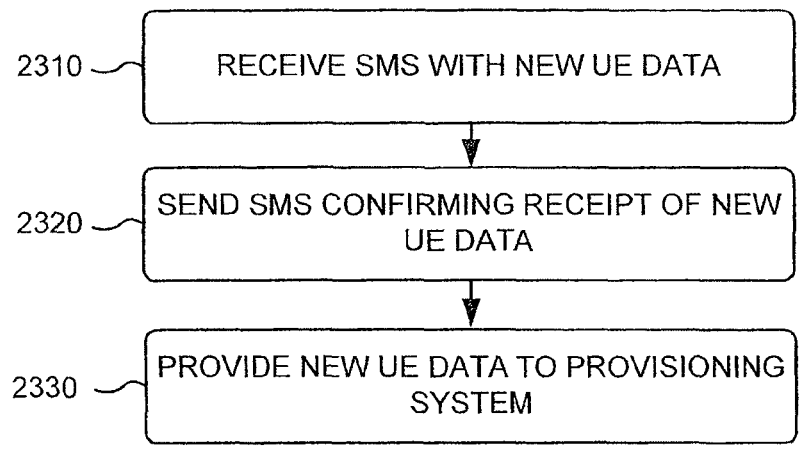
FIG. 23 is a flow diagram illustrating an example process of receiving new UE information via SMS, performed by the programming system, according to an implementation described herein.

FIG. 23 is a flow diagram illustrating an example process of receiving new UE information via SMS according to an implementation described herein. In one implementation, the process of FIG. 23 may be performed by programming system 190. In other implementations, some or all of the process of FIG. 23 may be performed by another device or a group of devices separate from or including programming system 190.

The process of FIG. 23 may include receiving an SMS with new UE information (block 2310). For example, programming system 190 may receive an SMS from UICC 102, via SMS center 195, with information about a new UE associated with UICC 102. The SMS may include the ICCID associated with UICC 102, the MSISDN, the IMSI, and the IMEI of the new UE.

An SMS confirming receipt of the new UE data may be sent (block 2320). For example, programming system 190 may send an SMS, via SMS center 195, to UICC 102, confirming that the SMS with the new UE has been received. The new UE data may be provided to provisioning system 180 (block 2330). For example, programming system 190 may send a device change notification to provisioning system 180. The device change notification may include, for example, the ICCID associated with UICC 102, the IMEI and/or IMEI_SV associated with UE 101, an old IMEI and/or IMEI_SV previously associated with UICC 102, the IMSI, the MIN, and the terminal profile. Provisioning system 180 may forward the device change notification to DMD 171.

Figure 24:
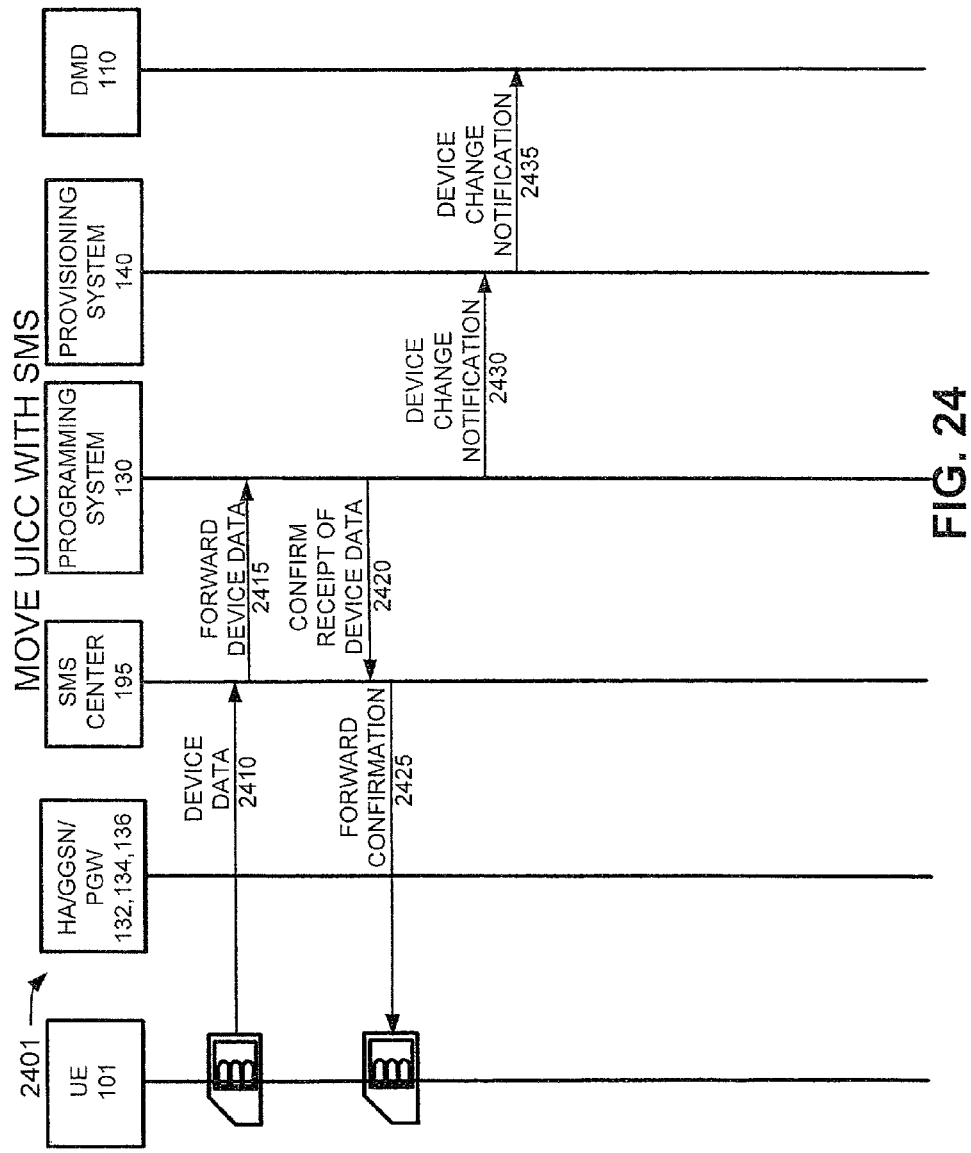
FIG. 24 is a diagram illustrating an example signal flow of sending new UE information via SMS according to an implementation described herein.

FIG. 24 is a diagram illustrating an example signal flow 2401 of sending new UE information via SMS according to an implementation described herein. Signal flow 2401 illustrates the process of FIGS. 22 and 23 in the context of system 100. Signal flow 2401 may include UICC 102 sending an SMS with new UE information, to SMS center 195, in response to detecting a new UE (signal 2410). The SMS may include, for example, the ICCID associated with UICC 102, the MSISDN, the IMSI, and the IMEI of the new UE. SMS center 195 may forward the SMS to programming system 190 (signal 2415). Programming system 190 may send an SMS to SMS center 195, confirming receipt of the new UE information (signal 2420). SMS center 195 may forward the confirmation to UICC 102 (signal 2425).

Programming system 190 may send a device change notification to provisioning system 180 (signal 2430) and provisioning system 180 may forward the device change notification to DMD 171 (signal 2435). The device change notification may include, for example, the ICCID associated with UICC 102, the MSISDN, the IMSI, and the IMEI of the new UE.

Figure 25:
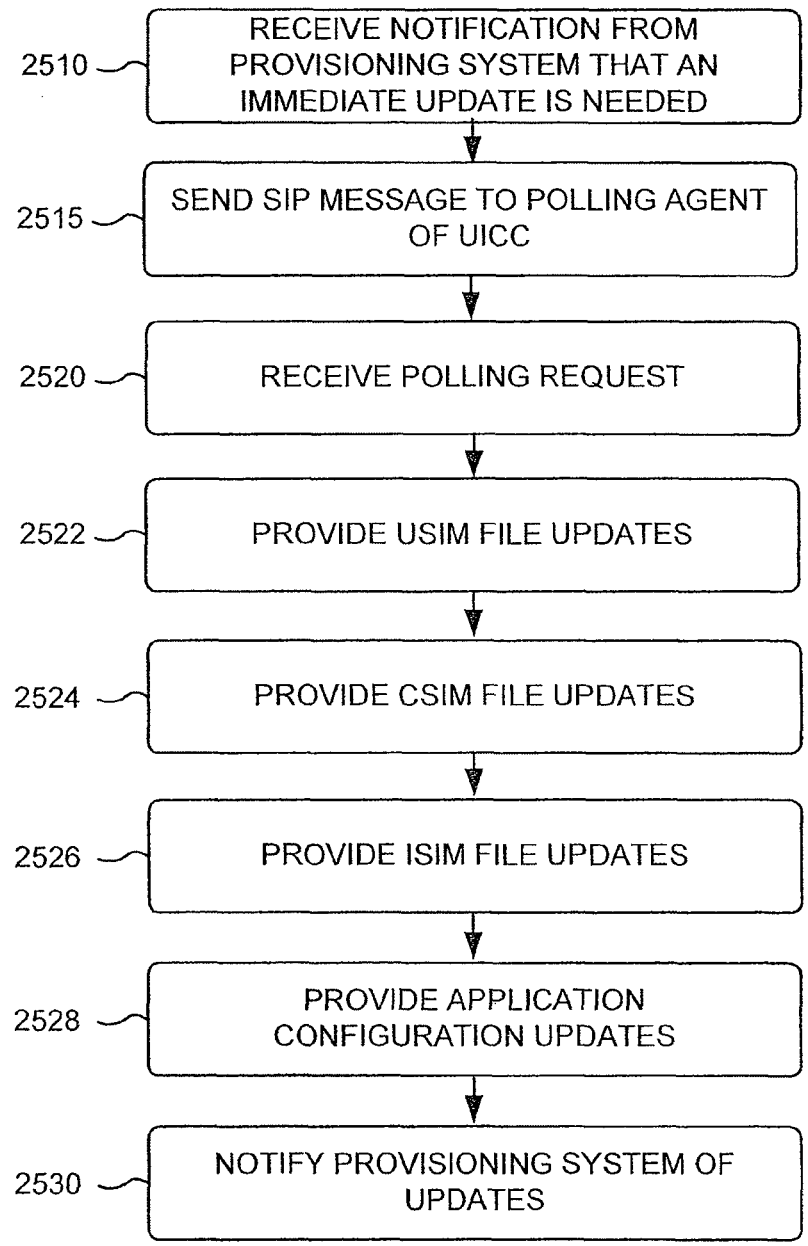
FIG. 25 is a flow diagram illustrating an example process of triggering updates via a Session Initiation Protocol (SIP) message, performed by the programming system, according to an implementation described herein.

FIG. 25 is a flow diagram illustrating an example process of triggering updates via SIP messages according to an implementation described herein. In one implementation, the process of FIG. 25 may be performed by programming system 190. In other implementations, some or all of the process of FIG. 25 may be performed by another device or a group of devices separate from or including programming system 190.

The process of FIG. 25 may include receiving a notification from provisioning system 180 that an immediate update is needed (block 2510). For example, a customer may change a service plan, which may require changes to information stored in UICC 102. As another example, changes in an access procedure for a particular access network may require changes to information stored in UICC 102.

A SIP message may be sent to a polling agent of UICC 102 (block 2515). For example, card update component 535 of programming system 190 may send a SIP message to an IMS address associated with UICC 102 (e.g., an IMS address stored in ISIM database 576). CSCF 196 may receive the SIP message, locate UICC 102 based on the SIP address, and forward the SIP message to UICC 102. The SIP message may instruct polling agent 580 to request an immediate update (block 2515).

A polling request may be received (block 2520). For example, programming system 190 may receive a polling request for updates from UICC 102 to program UICC 102. The polling request may include the ICCID associated with UICC 102.

USIM file updates may be provided (block 2522). For example, programming system 190 may provide USIM file updates to UICC 102. The USIM file updates may include, for example, updates to any fields of USIM database 572.

CSIM file updates may be provided (block 2524). For example, programming system 190 may provide CSIM file updates to UICC 102. The CSIM file updates may include, for example, updates to any fields of CSIM database 574.

ISIM file updates may be provided (block 2526). For example, programming system 190 may provide ISIM file updates to UICC 102. The ISIM file updates may include, for example, updates to any fields of ISIM database 572.

Application configuration updates may be provided (block 2528). For example, programming system 190 may provide application configuration updates to UICC 102. Application configuration updates may include, for example, updates to any fields of application configuration database 578.

Provisioning system 180 may be notified of updates (block 2530). Once all file updates have been provided to UICC 102, programming system 190 may send a notification to provisioning system 180 that UICC 102 has been activated. The notification may include the ICCID associated with UICC 102, the MSISDN, and a report of the updates that were performed by programming system 190.

Figure 26A:
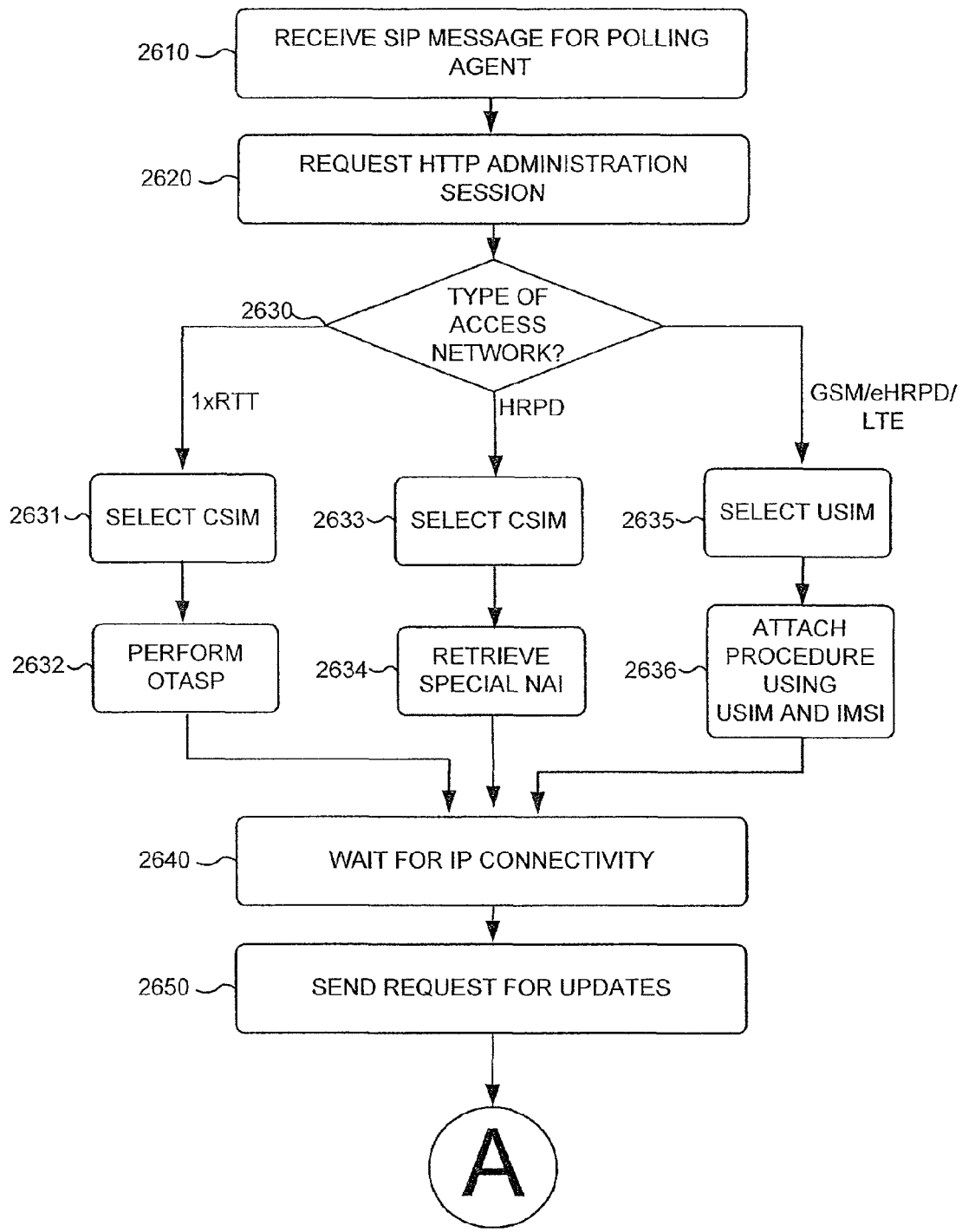
FIGS. 26A and 26B are flow diagrams illustrating an example process of triggering updates via a SIP message, performed by the UICC, according to an implementation described herein.
Figure 26B:
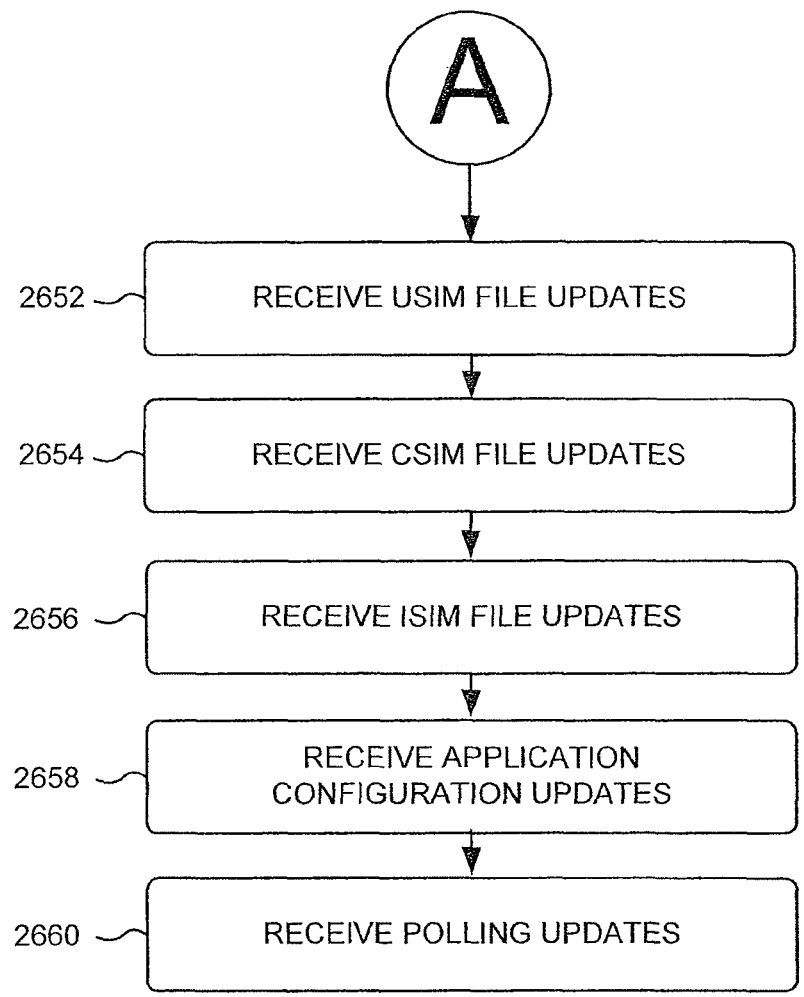

FIGS. 26A and 26B are flow diagrams illustrating an example process of triggering updates via SIP messaging according to an implementation described herein. In one implementation, the process of FIGS. 26A and 26B may be performed by UICC 102. In other implementations, some or all of the process of FIGS. 26A and 26B may be performed by another device or a group of devices separate from or including UICC 102.

The process of FIGS. 26A and 26B may include receiving a SIP message for polling agent 580 (block 2610). For example, UICC 102 may receive a SIP message from programming system 190, via CSCF 196, for polling agent 580, instructing polling agent 580 to immediately send a polling request for updates to programming system 190.

A new HTTP administration session may be requested (block 2620). For example, UICC 102 may request, in response to receiving the SMS, UE 101 to set up an HTTP administration session with core network 140 to that UICC 102 may be activated.

A type of access network may be determined (block 2630). For example, UICC 102 may query UE 101 to determine what kind of coverage is available. UE 101 may power up an RF transceiver and scan for base stations. Once UE 101 has detected a base station, UE 101 may identify a type of base station and provide information about the base station to UICC 102.

If an 1XRTT base station is detected (block 2630—1XRTT), CSIM 360 may be selected for performing updates (block 2631) and over the air service provisioning (OTASP) may be performed (block 2632). For example, card update component 570 may select CSIM 360 to be used for performing updates and CSIM 360 may retrieve an OTAF number stored in 1XRTT profile field 635 of CSIM database 572. The OTAF number may be provided to UE 101 and may be used to contact OTAF 162. OTAF 162 may perform an OTASP transaction, which may include providing UICC 102 with a mobile IMSI (IMSI_M). The provided IMSI_M may be used by UICC 102 to perform HLR authentication by contacting HLR 152. Once HLR 152 is contacted, waiting for IP connectivity may occur (block 2640).

If an HRPD base station is detected (block 2630—HRPD), CSIM 360 may be selected for performing updates (block 2633) and a special NAI may be retrieved (block 2634). For example, card update component 570 may select CSIM 360 to be used for performing updates and CSIM 360 may retrieve a special NAI stored in HRPD profile field 636 of CSIM database 572. The special NAI may be provided to UE 101 and waiting for IP connectivity may occur (block 2640).

If a GSM, an eHRPD, or an LTE base station is detected (block 2630—GSM/eHRPD/LTE), USIM 340 may be selected for performing updates (block 2635) and an attach procedure using USIM 340 and IMSI may be performed (block 2636). For example, UICC 102 may provide the IMSI to UE 101 and waiting for IP connectivity may occur (block 2640).

Once IP connectivity is established, a polling request may be sent (block 2650). For example, UICC 102 may send a polling request to programming system 190 to update UICC 102.

Continuing at FIG. 26B, USIM file updates may be received (block 2652). For example, USIM 340 may receive USIM file updates and store the updates in USIM database 572. The USIM file updates may include, for example, updates to any fields of USIM database 572.

CSIM file updates may be received (block 2654). For example, CSIM 360 may receive CSIM file updates and store the updates in CSIM database 574. The CSIM file updates may include, for example, updates to any fields of CSIM database 574.

ISIM file updates may be received (block 2656). For example, ISIM 350 may receive ISIM file updates and store the updates in ISIM database 576. The ISIM file updates may include, for example, updates to any fields of ISIM database 576.

Application configuration updates may be received (block 2658). For example, UICC 102 may receive application configuration updates and store the updates in application configuration database 578. Application configuration updates may include, for example, updates to any fields of application configuration database 578.

Polling updates may be received (block 2660). For example, UICC 101 may receive polling updates that indicate particular conditions that may cause UICC 102 to request updates from programming system 190. The particular conditions may include, for example, particular intervals at which updates are to be performed, or particular trigger events that may cause UICC 102 to request an update. The received polling updates may be stored in polling database 585.

FIG. 27 is a diagram illustrating an example signal flow 2701 of triggering updates via a SIP message according to an implementation described herein. Signal flow 2701 illustrates the process of FIGS. 25, 26A, and 26B in the context of system 100. Signal flow 2701 may include provisioning system 180 sending a request for an immediate update to programming system 190 (signal 2705). Programming system 190 may, in response to receiving the request, send a SIP message to an IMS address associated with UICC 102 and CSCF 196 may locate UICC 102 and may forward the SIP message to UICC 102 (signals 2710, 2715, and 2716).

IP connectivity may be established between UE 101 and HA 132, GGSN 134, or PGW 136 (signal 2720). For example, under CDMA 1XRTT or HRPD coverage, UE 101 may establish IP connectivity with HA 132; under GSM coverage, UE 101 may establish IP connectivity with GGSN 134; and under eHRPD or LTE coverage, UE 101 may establish IP connectivity with PGW 136.

Once IP connectivity is established, UICC 102 may send a polling request, which may include the ICCID, to programming system 190 (signal 2730). Programming system 190 may provide UICC 102 with USIM file updates (signal 2732), CSIM file updates (signal 2734), ISIM file updates (signal 2736), application configuration updates (signal 2738), and polling updates (signal 2740). Once the updates are performed, programming system 190 may send a notification to provisioning system 180 that UICC updates were performed (signal 2750).

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7, 9, 11A, 11B, 12, 14, 16A, 16B, 17, 19, 20A, 20B, 22, 23, 25, 26A, and 26B, the order of the blocks may be modified in other implementations. Further, non-dependent blocks may be performed in parallel.

Also, certain portions of the implementations may have been described as a "component" that performs one or more functions. The term "component" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A universal integrated circuit card comprising:
a universal subscriber identity module;
a code division multiple access subscriber identity module; and
logic configured to:
 determine that updates to the universal integrated circuit card are to be performed;
 determine a type of wireless access network available to a user equipment associated with the universal integrated circuit card;
 detect whether the type of available wireless access network corresponds to a code division multiple access enhanced High Rate Packet Data network or a code division multiple access network other than a code division multiple access enhanced High Rate Packet Data network;

request updates using the universal subscriber identity module, in response to detecting an available code division multiple access enhanced High Rate Packet Data network and in response to determining that updates are to be performed;

request updates using the code division multiple access subscriber identity module, in response to detecting an available code division multiple access network other than a code division multiple access enhanced High Rate Packet Data network and in response to determining that updates are to be performed;

receive, from a programming system, universal subscriber identity module file updates, in response to requesting updates using the universal subscriber identity module or using the code division multiple access subscriber identity module; and receive, from the programming system, code division multiple access subscriber identity module file updates, in response to requesting updates using the universal subscriber identity module or using the code division multiple access subscriber identity module.

2. The universal integrated circuit card of claim 1, further comprising:
a user equipment database that stores:
an identification string associated with the universal subscriber identity module;
an identification string associated with the user equipment associated with the universal subscriber identity module; and
a user equipment profile that stores information about the user equipment associated with the universal subscriber identity module.

3. The universal integrated circuit card of claim 1, wherein the logic is further configured to:
retrieve information about the user equipment associated with the universal subscriber identity module by communicating with the user equipment, in response to the user equipment being powered up.

4. The universal integrated circuit card of claim 1, where the universal subscriber identity module stores one or more of:
a Mobile Subscriber Integrated Services Digital Network number,
an International Mobile Subscriber Identity number,
information identifying a Home Public Land Mobile Network, or
a mobile country code list.

5. The universal integrated circuit card of claim 4, wherein the universal integrated circuit card is to use the universal subscriber identity module and the International Mobile Subscriber Identity number when the user equipment, associated with the universal integrated circuit card, is to perform an attachment procedure in a Global System for Mobile Communication access network or a Long Term Evolution access network.

6. The universal integrated circuit card of claim 1, where the code division multiple access subscriber identity module stores one or more of:
a Mobile Identification Number,
a Mobile Directory Number,
a 1XRTT access profile, or
a High Rate Packet Data access profile.

7. The universal integrated circuit card of claim 6, wherein the universal integrated circuit card is configured to use the code division multiple access subscriber identity module and the Mobile Identification Number when the user equipment, associated with the universal integrated circuit card, is to perform an attachment procedure in a code division multiple access network other than the code division multiple access enhanced High Rate Packet Data network.

8. The universal integrated circuit card of claim 7, wherein the logic is further configured to:
detect a code division multiple access 1XRTT access network;
retrieve an over the air function number from the 1XRTT access profile;
contact an over the air function using the retrieved over the air function number;
wait for Internet Protocol connectivity to be established between the user equipment, associated with the universal integrated circuit card, and a home agent associated with the code division multiple access 1XRTT access network; and
send a request for updates to a programming system to update the universal integrated circuit card.

9. The universal integrated circuit card of claim 7, wherein the logic is further configured to:
detect a code division multiple access High Rate Packet Data access network;
retrieve a special network access identifier from the High Rate Packet Data access profile;
send the special network access identifier to an authentication, authorization, and accounting server;
wait for Internet Protocol connectivity to be established between the user equipment, associated with the universal integrated circuit card, and a home agent associated with the code division multiple access High Rate Packet Data access network; and
send a request for updates to a programming system to update the universal integrated circuit card.

10. The universal integrated circuit card of claim 1, wherein the logic is further configured to:
receive, from the programming system, application configuration updates, where wherein the application configuration updates are to be used with applications associated with the user equipment, associated with the universal integrated circuit card.

11. The universal integrated circuit card of claim 1, wherein the universal integrated circuit card further comprises an Internet Protocol Multimedia Subsystem subscriber identity module, wherein the universal subscriber identity module is configured to use the Internet Protocol Multimedia Subsystem subscriber identity module when communicating with an Internet Protocol Multimedia Subsystem network, and wherein the logic is further configured to:
receive, from the programming system, Internet Protocol Multimedia Subsystem subscriber identity module file updates.

12. The universal integrated circuit card of claim 1, wherein, when the logic is determining that updates to the universal integrated circuit card are to be performed, the logic is configured to determine that a polling interval has been reached.

13. The universal integrated circuit card of claim 1, wherein, when the logic is determining that updates to the universal integrated circuit card are to be performed, the logic is configured to receive a short message service message from a programming system via a short message service center.

14. The universal integrated circuit card of claim 1, wherein, when the logic is determining that updates to the universal integrated circuit card are to be performed, the logic is configured to receive a session initiation protocol message from a programming system via an Internet Protocol Multimedia Subsystem.

15. The universal subscriber identity module of claim 1, wherein the logic is further configured to:
  detect a new user equipment associated with the universal subscriber identity module; and
  send information about the new user equipment to a programming system, in response to detecting the new user equipment.

16. The universal integrated circuit card of claim 15, wherein, when the logic is sending the information about the new user equipment to the programming system, the logic is configured to:
  send a short message service message with the information to the programming system.

17. A method performed by a universal integrated circuit card, the method comprising:
  determining, by a processor associated with the universal integrated circuit card, that updates to the universal integrated circuit card are to be performed;
  determining, by the processor, a type of wireless access network available to a user equipment associated with the universal integrated circuit card;
  detecting, by the processor, whether the type of available wireless access network corresponds to a code division multiple access enhanced High Rate Packet Data network or a code division multiple access network other than a code division multiple access enhanced High Rate Packet Data network;
  requesting, by the processor, updates of the universal integrated circuit card, using a universal subscriber identity module, in response to detecting an available code division multiple access enhanced High Rate Packet Data network and in response to determining that updates to the universal integrated circuit cards are to be performed;
  requesting, by the processor, updates of the universal integrated circuit card, using a code division multiple access subscriber identity module, in response to detecting an available code division multiple access network other than a code division multiple access enhanced High Rate Packet Data network and in response to determining that updates are to be performed;
  receiving, by the processor and from a programming system, universal subscriber identity module file updates, in response to requesting updates using the universal subscriber identity module or using the code division multiple access subscriber identity module; and
  receiving, by the processor and from the programming system, code division multiple access subscriber identity module file updates, in response to requesting updates using the universal subscriber identity module or using the code division multiple access subscriber identity module.

18. The method of claim 17, where requesting updates for the universal integrated circuit card using the universal subscriber identity module comprises:
  performing an attachment procedure using the universal subscriber identity module and an International Mobile Subscriber Identity number associated with the universal integrated circuit card;
  waiting for Internet Protocol connectivity to be established between the user equipment, associated with the universal integrated circuit card, and a packet data network gateway;
  sending, in response to detecting Internet Protocol connectivity, a request for updates to the programming system;
  receiving, from the programming system, Internet Protocol Multimedia Subsystem subscriber identity module file updates; and
  receiving, from the programming system, application configuration updates, where the application configuration updates are to be used with applications associated with the user equipment, associated with the universal integrated circuit card.

19. The method of claim 17, where requesting updates for the universal integrated circuit card using the code division multiple access subscriber identity module comprises:
  detecting a code division multiple access 1XRTT access network;
  contacting an over the air function using an over the air function number;
  waiting for Internet Protocol connectivity to be established between the user equipment, associated with the universal integrated circuit card, and a home agent associated with the code division multiple access 1XRTT access network;
  sending, in response to detecting Internet Protocol connectivity, a request for updates to the programming system;
  receiving, from the programming system, Internet Protocol Multimedia Subsystem subscriber identity module file updates; and
  receiving, from the programming system, application configuration updates, where the application configuration updates are to be used with applications associated with the user equipment, associated with the universal integrated circuit card.

20. The method of claim 17, where requesting updates for the universal integrated circuit card using the code division multiple access subscriber identity module comprises:
  detecting a code division multiple access High Rate Packet Data access network;
  sending a special network access identifier to an authentication, authorization, and accounting server;
  waiting for Internet Protocol connectivity to be established between the user equipment, associated with the universal integrated circuit card, and a home agent associated with the code division multiple access High Rate Packet Data access network;
  sending a request for updates to the programming system;
  receiving, from the programming system, Internet Protocol Multimedia Subsystem subscriber identity module file updates; and
  receiving, from the programming system, application configuration updates, where the application configuration updates are to be used with applications associated with the user equipment, associated with the universal integrated circuit card.

21. The method of claim 17, where determining that updates to the universal integrated circuit card are to be performed includes:
  detecting that a particular interval has elapsed.

22. The method of claim 17, where determining that updates to the universal integrated circuit card are to be performed includes:
  receiving a short message service message from the programming system, where the short message service message includes an instruction to request an immediate update.

23. The method of claim 17, where determining that updates to the universal integrated circuit card are to be performed includes:
  receiving a session initiation protocol message from the programming system via an Internet Protocol Multimedia Subsystem, where the session initiation protocol message includes an instruction to request an immediate update.

24. The method of claim 17, further comprising:
detecting a new user equipment associated with the universal integrated circuit card; and
sending information about the new user equipment to a programming system, in response to detecting the new user equipment.

25. The method of claim 24, where sending the information about the new user equipment comprises:
sending a short message service message with the information to the programming system.

26. One or more non-transitory computer-readable memory devices storing instructions executable by one or more processors, the one or more non-transitory computer-readable memory devices comprising:
one or more instructions to determine that updates to a universal integrated circuit card are to be performed;
one or more instructions to determine a type of wireless access network available to a user equipment associated with the universal integrated circuit card;
one or more instructions to detect whether the type of available wireless access network corresponds to a code division multiple access enhanced High Rate Packet Data network or a code division multiple access network other than a code division multiple access enhanced High Rate Packet Data network;
one or more instructions to perform updates for the universal integrated circuit card using a universal subscriber identity module, in response to detecting an available code division multiple access enhanced High Rate Packet Data network and in response to determining that updates to the universal integrated circuit cards are to be performed;
one or more instructions to perform updates for the universal integrated circuit card using a code division multiple access subscriber identity module, in response to detecting an available code division multiple access network other than a code division multiple access enhanced High Rate Packet Data network and in response to determining that updates to the universal integrated circuit cards are to be performed; and
wherein performing the updates of the universal integrated circuit card using the universal subscriber identity module or using the code division multiple access subscriber identity module comprises one or more of:
receiving, from a programming system, universal subscriber identity module file updates;
receiving, from the programming system, code division multiple access subscriber identity module file updates;
receiving, from the programming system, Internet Protocol Multimedia Subsystem subscriber identity module file updates; or
receiving, from the programming system, application configuration updates, where the application configuration updates are to be used with applications associated with the user equipment, associated with the universal subscriber identity module.

* * * * *